" "

(12) United States Patent
Knopp et al.

(10) Patent No.: US 12,167,306 B2
(45) Date of Patent: Dec. 10, 2024

(54) VEHICULAR AD-HOC NETWORK MANAGER

(71) Applicant: FORD GLOBAL TECHNOLOGIES, LLC, Dearborn, MI (US)

(72) Inventors: Colette Knopp, South Lyon, MI (US); Kapil Gupta, Ann Arbor, MI (US); Jason Haisma, Canton, MI (US); Alexander Katriniok, Aachen (DE); Justin Martins, Ottawa (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 470 days.

(21) Appl. No.: 17/681,475

(22) Filed: Feb. 25, 2022

(65) Prior Publication Data

US 2023/0276209 A1 Aug. 31, 2023

(51) Int. Cl.
| | |
|---|---|
| *H04W 4/40* | (2018.01) |
| *H04W 4/02* | (2018.01) |
| *H04W 4/46* | (2018.01) |
| *H04W 84/18* | (2009.01) |

(52) U.S. Cl.
CPC ............. *H04W 4/40* (2018.02); *H04W 4/027* (2013.01); *H04W 4/46* (2018.02); *H04W 84/18* (2013.01)

(58) Field of Classification Search
CPC ............. H04W 4/027; H04W 4/40–48; H04W 67/104; H04W 67/125; H04W 84/18
See application file for complete search history.

(56) References Cited

U.S. PATENT DOCUMENTS

| | | | | |
|---|---|---|---|---|
| 7,251,222 | B2 * | 7/2007 | Chen | ................... H04L 61/5038 |
| | | | | 370/408 |
| 7,907,934 | B2 * | 3/2011 | Naghian | ............... H04W 12/02 |
| | | | | 379/189 |
| 8,914,471 | B2 * | 12/2014 | Pazos | ..................... H04L 67/06 |
| | | | | 709/219 |
| 9,336,681 | B2 * | 5/2016 | Annapureddy | ....... H04W 4/024 |
| 10,721,307 | B2 | 7/2020 | Moustafa et al. | |
| 11,075,910 | B2 | 7/2021 | Dean et al. | |
| 11,595,947 | B2 * | 2/2023 | Gholmieh | ......... H04W 28/0236 |
| 11,889,538 | B2 * | 1/2024 | Gholmieh | ............. H04W 72/02 |

(Continued)

FOREIGN PATENT DOCUMENTS

| | | | | |
|---|---|---|---|---|
| CN | 113624246 B | * | 5/2024 | ......... G01C 21/3415 |
| WO | WO-2020207755 A1 | * | 10/2020 | ......... H04L 63/0421 |

OTHER PUBLICATIONS

Ma et al., "Vehicle Position Correcting Device and Vehicle Position Correcting Method," Machine English Translation, Clarivate Analytics, pp. 1-16 (Year: 2024).*

(Continued)

*Primary Examiner* — Thomas R Cairns
(74) *Attorney, Agent, or Firm* — Joseph Zane; Brooks Kushman P.C.

(57) ABSTRACT

An ad-hoc network manager is provided. The vehicle includes a transceiver and one or more controllers of the host vehicle, in communication with the transceiver. The one or more controllers are programmed to receive connected messages from remote vehicles via the transceiver, and execute a message subservice configured to provide, to vehicle applications executed by the one or more controller, one or more events related to the received connected messages.

20 Claims, 17 Drawing Sheets

(56) References Cited

U.S. PATENT DOCUMENTS

| | | | | |
|---|---|---|---|---|
| 2005/0002347 | A1* | 1/2005 | Lee | G08G 1/0104 |
| | | | | 370/312 |
| 2012/0309425 | A1* | 12/2012 | El Khayat | H04W 4/80 |
| | | | | 455/456.3 |
| 2017/0337571 | A1* | 11/2017 | Bansal | G07C 5/008 |
| 2018/0249295 | A1* | 8/2018 | Moraru | H04W 4/024 |
| 2019/0173971 | A1* | 6/2019 | Na | H04W 4/70 |
| 2019/0392716 | A1* | 12/2019 | Lu | H04W 4/026 |
| 2020/0162867 | A1* | 5/2020 | Thein | H04W 80/08 |
| 2020/0231121 | A1* | 7/2020 | Dudekula | G06Q 50/40 |
| 2020/0234578 | A1* | 7/2020 | Zhang | G08G 1/0116 |
| 2020/0282981 | A1* | 9/2020 | Wang | B60Q 9/008 |
| 2021/0112441 | A1* | 4/2021 | Sabella | H04W 4/38 |
| 2022/0150775 | A1* | 5/2022 | Kim | H04W 36/22 |

OTHER PUBLICATIONS

A Vehicle-to-Everything Solution for Connected and Autonomous Vehicles, the Altran V2X Its Software Framework, https://www.ftc.gov/system/files/documents/public_comments/2017/07/00055-141127.pdf.

* cited by examiner

VEHICULAR AD-HOC NETWORK MANAGER

TECHNICAL FIELD

Aspects of the present disclosure generally relate to ad-hoc network manager for vehicle-to-everything (V2X) messaging.

BACKGROUND

V2X communication allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure.

SUMMARY

In one or more illustrative examples, a host vehicle implementing an ad-hoc network manager is provided. The vehicle includes a transceiver and one or more controllers of the host vehicle, in communication with the transceiver. The one or more controllers are programmed to receive connected messages from remote vehicles via the transceiver, the connected messages indicating position, speed, time, and acceleration information of the remote vehicles. The one or more controllers are further programmed to execute a message subservice configured to provide, to vehicle applications executed by the one or more controllers: a first event periodically publishing a set of messages received from the remote vehicles within a predefined first time period, the first event indicating the connected messages received within the first time period, and a second event periodically publishing a second set of messages received from the remote vehicles within a predefined second time period, the second event indicating a complete listing of the remote vehicles, the second time period being longer than the first time period.

In one or more illustrative examples, a method for implementing an ad-hoc network manager is provided. Connected messages are received from remote vehicles via a transceiver of a host vehicle, the connected messages indicating position, speed, time, and acceleration information of the remote vehicles. A message subservice is executed, using one or more controllers of the host vehicle, to provide, to vehicle applications executed by the one or more controllers: a first event periodically publishing a set of messages received from the remote vehicles within a predefined first time period, the first event indicating the connected messages received within the first time period, and a second event periodically publishing a second set of messages received from the remote vehicles within a predefined second time period, the second event indicating a complete listing of the remote vehicles, the second time period being longer than the first time period.

In one or more illustrative examples, a non-transitory computer-readable medium includes instructions for implementing an ad-hoc network manager that, when executed by one or more controllers of a host vehicle, cause the host vehicle to perform operations including to receive connected messages from remote vehicles via a transceiver of the host vehicle, the connected messages indicating position, speed, time, and acceleration information of the remote vehicles, and execute a message subservice to provide to vehicle applications executed by the one or more controllers: a first event periodically publishing a set of messages received from the remote vehicles within a predefined first time period, the first event indicating the connected messages received within the first time period, and a second event periodically publishing a second set of messages received from the remote vehicles within a predefined second time period, the second event indicating a complete listing of the remote vehicles, the second time period being longer than the first time period.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Cellular vehicle-to-everything (C-V2X) technology enables vehicles to send and receive messages with other vehicles and infrastructure to improve efficiency and convenience of driving. However, it may be cumbersome for applications running on various controllers of the vehicle to buffer, decode, and utilize such messages. Moreover, it may be difficult for an application to filter out the messages that the specific application is interested in from the C-V2X modem.

A VANET manager may be implemented as middleware to receive messages from the C-V2X modem and provide filtered and customized messages via application programming interfaces (APIs) to the applications in the vehicle. This VANET manager may be used to provide an interface to basic safety messages (BSMs) from other vehicles. The VANET manager may also be used to provide signal phase and timing (SPAT) and map messages from traffic lights in a convenient fashion. The VANET manager may also support exchange of signal request and signal status messages with traffic lights for features such as traffic light overrides. Further details of the VANET manager are discussed in detail herein.

Figure 1:
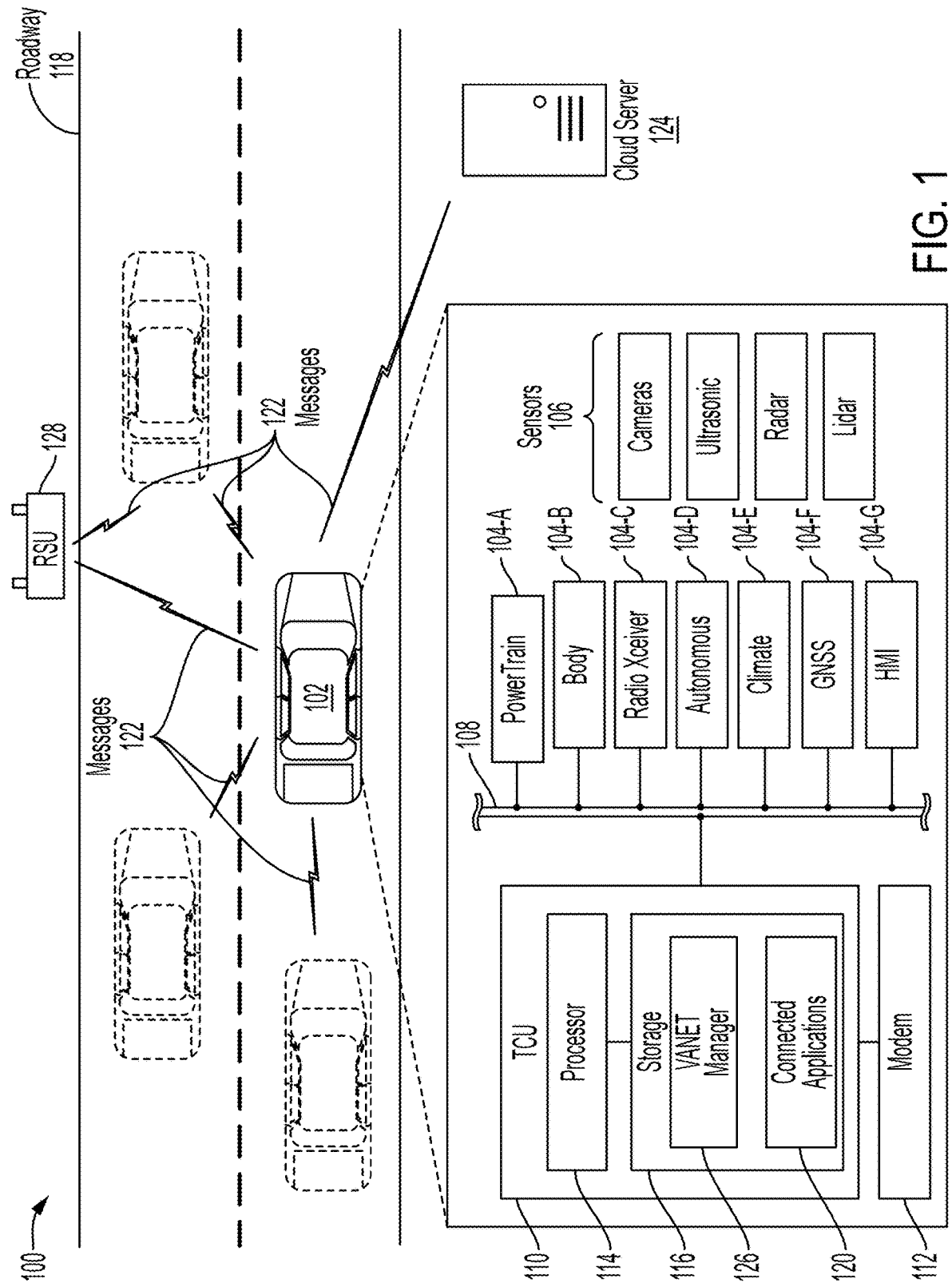
FIG. 1 illustrates an example system implementing an ad-hoc network manager for a vehicle.

FIG. 1 illustrates an example system 100 system implementing a VANET manager 126 for a vehicle 102. The vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an Automated Vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants equipped with V2X technology may additionally or alternately be used, such as bicycles, scooters, and pedestrians.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., 104-A through 104-G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global navigation satellite system (GNSS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver-assistance system (ADAS) cameras), ultrasonic sensors, radar systems, and/or lidar systems.

One or more vehicle buses 108 may include various methods of communication available between the vehicle controllers 104, as well as between a telematics control unit (TCU) 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a modem 112 configured to facilitate communication with other vehicles 102 or with infrastructure. The TCU 110 may, accordingly, be configured to communicate over various protocols, such as with a communication network over a network protocol (such as Uu). The TCU 110 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116)

includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, etc.

The TCU 110 may be configured to include one or more interfaces from which vehicle information may be sent and received. This information can be sensed, recorded, and sent to one or more cloud servers 124. In an example, the cloud server 124 may also include one or more processors (not shown) configured to execute computer instructions, and a storage medium (not shown) on which the computer-executable instructions and/or data may be maintained.

The TCU 110 may be configured to facilitate the collection of connected vehicle data and/or other vehicle information from the vehicle controllers 104 connected to the one or more vehicle buses 108. While only a single vehicle bus 108 is illustrated, it should be noted that in many examples, multiple vehicle buses 108 are included, usually with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to periodically transmit messages 122 for reception by other vehicles 102. For instance, the frequency may be on the order of every ten milliseconds. The TCU 110 may be further configured to receive messages 122 from other vehicles 102. In an example, the management of sending and receiving of connected vehicle data may be handled by a connected application 120 executed by the TCU 110. The messages 122 may include collected information retrieved from the controllers 104 over the vehicle buses 108. In many examples, the collected information data may include information useful for autonomous vehicle operations or driver-assistance vehicle operations. The connected vehicle data information retrieved by the TCU 110 may include, as some non-limiting examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data information may also include weather data (such as ambient temperature, ambient air pressure, etc.), traction control status, wiper status, or other vehicle status information (such as the status of exterior vehicle lights, type of vehicle, antilock brake system (ABS) system status, etc.). In one example, the messages 122 may take the form of BSM messages as described in the society of automotive engineers (SAE) standard document J2735.

In some examples traffic participants may additionally involve communication via one or more roadside units (RSUs) 128. The RSU 128 may be a device with processing capabilities and networking capabilities, and may be designed to be placed in proximity of a roadway 118 for use in communicating with the vehicles 102. In an example, the RSU 128 may include hardware configured to communicate over the broadcast peer-to-peer protocol (such as PC5), to facilitate C-V2X communications with the vehicles 102. The RSU 128 may, accordingly, be able to communicate with multiple vehicles 102 along a specific roadway 118 or in a specific area. The RSU 128 may also have wired or wireless backhaul capability to allow for communication with other elements of a traffic control system, via e.g., Ethernet, or cellular connection to the cellular network infrastructure, for example over Uu interface.

The VANET manager 126 may be configured to receive messages from the modem 112 and provide filtered and customized messages via APIs to the applications 120 in the vehicle. In an example, the VANET manager 126 may be used to provide an interface to BSMs from other vehicles 102. The VANET manager 126 may also be used to provide SPAT and MAP messages from traffic lights in a convenient traffic light object. The VANET manager 126 may also support the exchange of signal request and signal status messages with traffic lights to implement traffic signal overrides.

Figure 2:
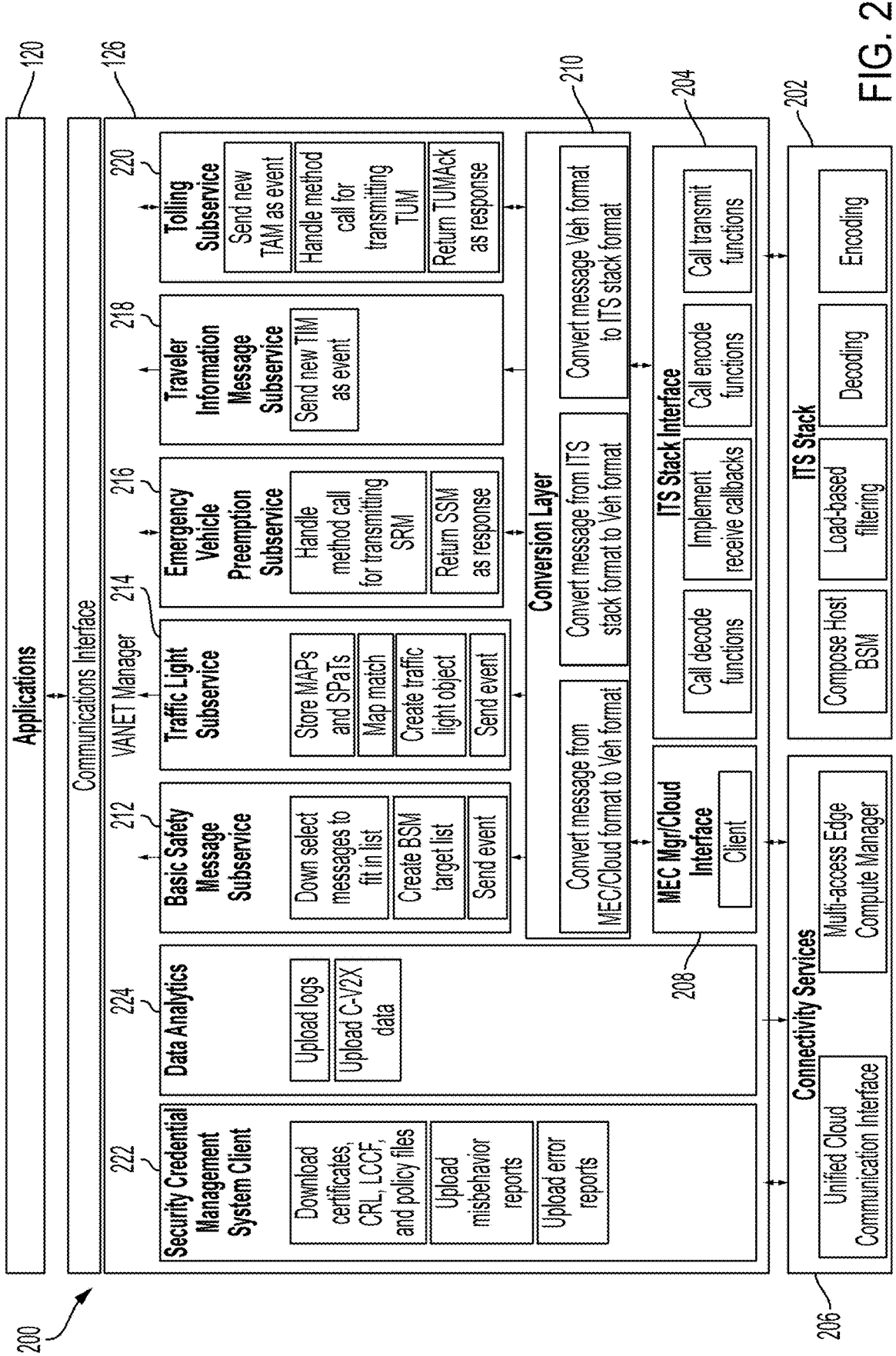
FIG. 2 illustrates details of the architecture of the vehicle ad-hoc network manager (VANET) manager of the vehicle.

FIG. 2 illustrates details of the architecture of the VANET manager 126 of the vehicle 102. Beginning with the message interface, the VANET manager 126 may be configured to communicate with an intelligent transport system (ITS) stack 202 via an ITS stack interface 204. The ITS stack 202 may be configured to perform functions such as decoding of messages 122 received via the modem 112, encoding messages 122 for sending via the cellular modem 112, creating host BSM messages 122, and load-based filtering. The ITS stack interface 204 may be a component of the VANET manager 126 configured to provide services such as call encode functions, call decode functions, call transmit functions, and implement and receive callbacks between the VANET manager 126 and the ITS stack 202.

The VANET manager 126 may also be configured to communicate with other connectivity services 206 in communication with the vehicle 102. The connectivity services 206 may include a cloud communications interface for communication with the cloud server 124. The connectivity services 206 may also include an edge computing manager for communication with roadside units or mobile edge computing (MEC) devices. The VANET manager 126 may further include a MEC interface 208 configured to provide messaging between the subservices of the VANET manager 126 and the connectivity services 206.

The ITS stack interface 204 and the MEC interface 208 may be configured to communicate with a conversion layer 210. The conversion layer 210 may be configured to allow the VANET manager 126 to perform operations such as conversion of messages 122 from a MEC or cloud format into an internal VANET manager representation, conversion of messages 122 from a ITS stack format into the internal VANET manager representation, and conversion of the internal VANET manager representation format into messages 122 in the ITS stack format.

The conversion layer 210 may be configured to support various subservices that provide high level functionality to the connected applications 120. These subservices may include a BSM subservice 212, a traffic light subservice 214, a vehicle preemption subservice 216, a traveler information message subservice 218, and a tolling subservice 220.

The BSM subservice 212 may be used to provide an interface to BSMs from other vehicles. This BSM subservice 212 may be configured to filtering the receive BSMs and create a list, with the format of the message structure, list size, and send interval optimized for various vehicle architecture and use cases. The BSM subservice 212 may down select messages 122 to fit in the list, create a BSM target list, and send events to applications 120 utilizing the services of the BSM subservice 212. Further aspects of the BSM subservice 212 are discussed with respect to FIGS. 3-5.

The traffic light subservice 214 may be configured to receive SPaT/MAP messages, perform map matching and filtering out of information that does not apply to current vehicle 102 lanes, and send a custom data structure to the applications 120 descriptive of upcoming traffic lights. The traffic light subservice 214 may be configured to store MAP and SPAT messages, match MAP and SPAT messages, create a traffic light object, and send events to applications 120 utilizing the services of the traffic light subservice 214. Further aspects of the traffic light subservice 214 are discussed with respect to FIGS. 6-12.

The vehicle preemption subservice 216 may be configured to utilize signal request message (SRM)/signal status message (SSM) exchange, to request information from the applications 120 and send SRM/SSM information to applications with an interface that is customized for various applications 120. The vehicle preemption subservice 216 may be configured to handle method calls for transmitting the SRM as well as for returning the SSM as a response. Further aspects of the traffic light subservice 214 are discussed with respect to FIGS. 13-14.

The traveler information message subservice 218 may be configured to convey traffic information and provide situational awareness alerting to occupants of the vehicle 102. The traveler information message subservice 218 may be configured to alert the applications 120 of new traveler information messages (TIMs) being available.

The tolling subservice 220 may be configured to support tolling functionality via C-V2X for various roadways 118. The tolling subservice 220 may be configured to send new toll access messages (TAMs) descriptive of the pricing and roadway 118 to the applications 120. The tolling subservice 220 may also be configured to handle method calls for transmitting tolling usage messages (TUMs) to infrastructure descriptive of the vehicle 102 use of the roadway 118. The tolling subservice 220 may also be configured to return tolling usage message acknowledgments (TUMAck) to the applications 120 to indicate completion of the tolling scenario.

The VANET manager 126 may be configured to provide additional functionality to applications 120 in addition to the subservices. In an example, the VANET manager 126 may provide a security credential management system client 222. The security credential management system client 222 may offer applications 120 services such as the download of certificates and policies, and the upload of misbehavior reports and/or error reports. In another example, the VANET manager 126 may provide data analytics 224 functionality to the applications 120, such as the upload of logs and C-V2X data from the applications 120 to the cloud servers 124.

Figure 3:
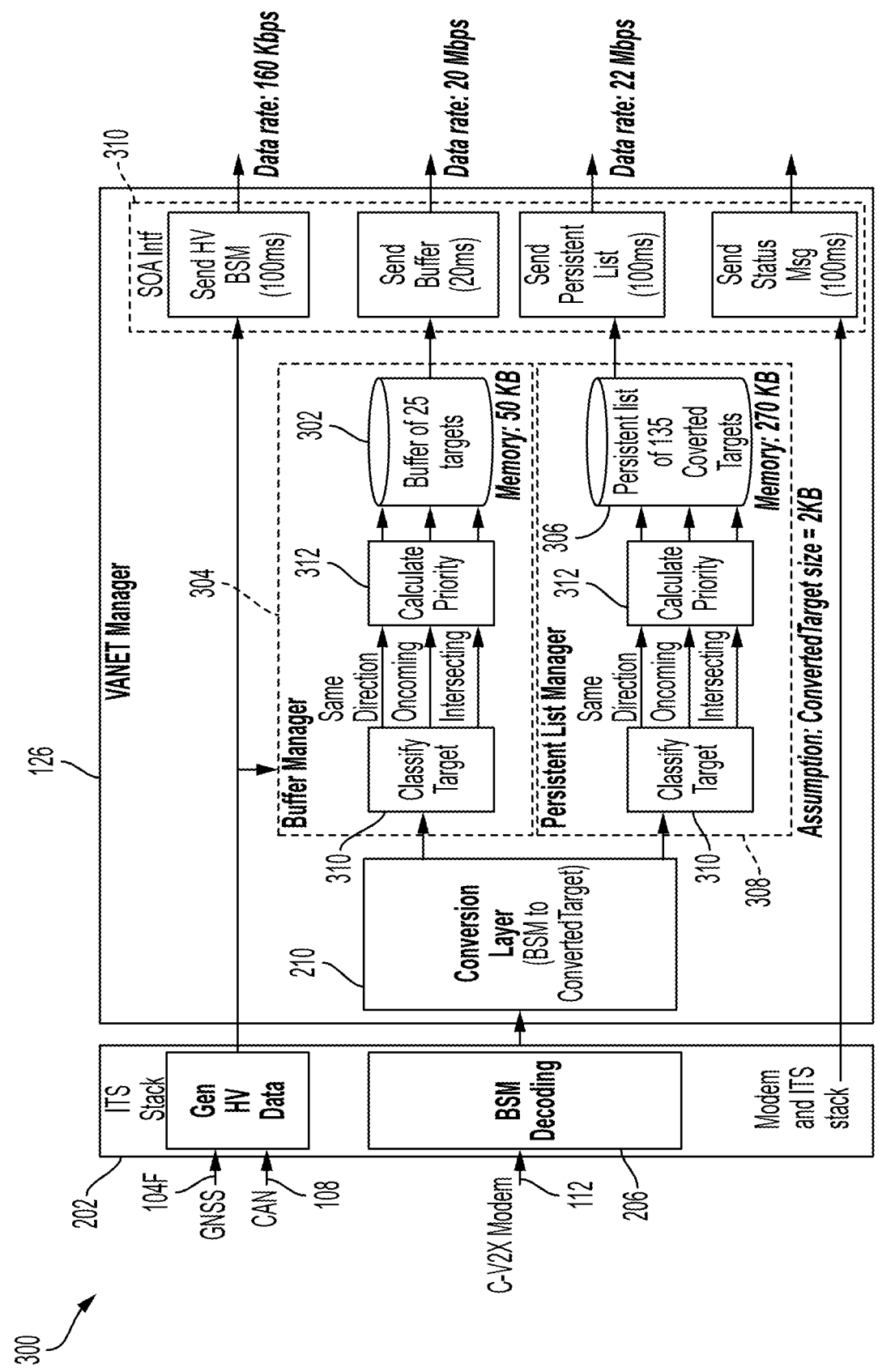
FIG. 3 illustrates further details of the BSM subservice of the VANET manager.

FIG. 3 illustrates further details of the BSM subservice 212 of the VANET manager 126. The BSM subservice 212 may receive the BSMs from the conversion layer 210, which in turn receives the BSMs from the modem 112. The BSM subservice 212 may process these received BSMs and create a list of BSMs to send to the target applications 120. Two BSM event interfaces may be offered to applications 120 via the BSM subservice 212: a buffer event list 302 controlled by a buffer manager 304 and a persistent event list 306 controlled by a persistent list manager 308. It should be noted that while certain possible data rates, storage capacities, and timing intervals are indicated in the FIGS. (including FIG. 3), these are merely examples and other data rates, storage capacities, and timing intervals may be used.

The buffer event list 302 may be configured to buffer up to a predefined quantity of BSM messages (e.g., up to twenty-five BSMs) over a predefined period (e.g., a twenty millisecond period). The buffer manager 304 may allow the buffer to accumulate new BSMs of the predefined quantity over the predefined time period. Responsive to the time period having passed, the buffer manager 304 publishes the buffer and clears out the storage for the next 20 ms period. The buffer event list 302 does not implement message persistence. Because remote vehicles (RVs) typically transmit a new BSM every 100 ms, this buffer may not provide a complete list of all vehicles within range. Instead, such a buffer event list 302 may be maintained on the application 120 side by collecting these events over a 100 ms period. If more than the predefined quantity of BSMs are received in the predefined time period, a prioritization algorithm is may be used by the buffer manager 304 to select the BSMs to maintain in the buffer. This event type may be useful for DAT applications 120 that require low latency input and maintain their own persistent list of targets for association with other radar and camera targets prior to processing.

The persistent event list 306 may be configured to buffer up a larger predefined quantity of BSM messages (e.g., up to 135 BSMs) over a larger predefined period (e.g., a 100 millisecond period) as compared to the buffer event list. The persistent list manager 308 may allow the persistent list to holds BSMs for a longer timeframe, e.g., up to 650 ms before removing them. The timeout period may vary, but 650 ms may be because an RV may increase the interval between transmissions from 100 ms up to 650 ms when there is too much C-V2X channel congestion. Because RVs typically transmit a new BSM every 100 ms, this persistent event list 306 may contain a complete, updated picture of all surrounding vehicles every time it is published. In the event that more than 135 vehicles are within C-V2X range, a prioritization algorithm may be used by the persistent list manager 308 to down-select the BSMs. This event type is ideal for non-DAT applications 120 that do not have strict latency requirements and do not maintain their own persistent list of targets.

The buffer manager 304 and the persistent list manager 308 may each include a target classifier 310. The classifier 310 may be implemented after the conversion layer 210 in an example. The classifier 310 may be configured to determine, for each BSM, whether the message is same direction, oncoming, or intersecting with the vehicle 102. The same direction determination may include a horizontal range filter, based on a parameter related to how many lanes of travel to capture. The oncoming determination may also utilize a horizontal range filter. The intersecting, oncoming, and same direction filtering may also each utilize an altitude filter to ensure the RVs are in a relevant plane.

In a specific example, the classifier 310 may classify each of the BSMs into one of the categories as shown in Table 1:

TABLE 1

BSM classification rules

| Category | Conditions |
| --- | --- |
| Same-Direction - Ahead | The azimuth of the RV is greater than −90° and less than 90° (RV is ahead). The absolute value of the Relative Vehicle Heading between the host vehicle (HV) and RV is less or equal than 60° (RV is Same-Direction). |
| Same-Direction - Behind | The azimuth of the RV is greater or equal than −180° and less or equal than −90°, or greater or equal than 90° and less than 180° (RV is behind). The absolute value of the Relative Vehicle Heading between the HV and RV is less or equal than 60° (RV is Same-Direction). |
| Oncoming - Ahead | The azimuth of the RV is greater than −90° and less than 90° (RV is ahead). The absolute value of the Relative Vehicle Heading between the HV and RV is greater or equal than 120° (RV is oncoming). |
| Oncoming - Behind | The azimuth of the RV is greater or equal than −180° and less or equal than −90°, or greater or equal than 90° and less than 180° (RV is behind). The absolute value of the Relative Vehicle Heading between the HV and RV is greater or equal than 120° (RV is oncoming). |
| Intersecting - Right | The value of Relative Vehicle Heading between the HV and RV is less than −60° and greater than −120° (RV is intersecting right). |
| Intersecting - Left | The value of Relative Vehicle Heading between the HV and RV is greater than 60° and less than 120° (RV is intersecting left). |

The buffer manager 304 and the persistent list manager 308 may each include a target prioritization 312. This may be implemented, in an example, after the classifier 310. The target prioritization 312 may implement an algorithm for use by both the 25 BSM buffer and the 135 BSM persistent list to down select the BSMs when the buffer or list is full.

The BSMs in the list may be sorted by Prioritized Range, where Prioritized Range=Range/Priority Factor. After sorting, the function may select the BSMs with the lowest Prioritized Range. The Prioritization Map may be a lookup table including a value pair of Range Rate (RR) and Priority Factor (PF) points. For a given RV range rate, the target prioritization 312 may utilize linear interpolation to compute that RV's priority factor based on the points in the table. An example equation for linear interpolation may be as follows: $PF=((PF_1-PF_0)/(RR_1-RR_0))*(RR_1-RR_0)+PF_0$. If a range rate is outside of the values in the lookup table, a closest priority factor may be used directly.

Figure 4:
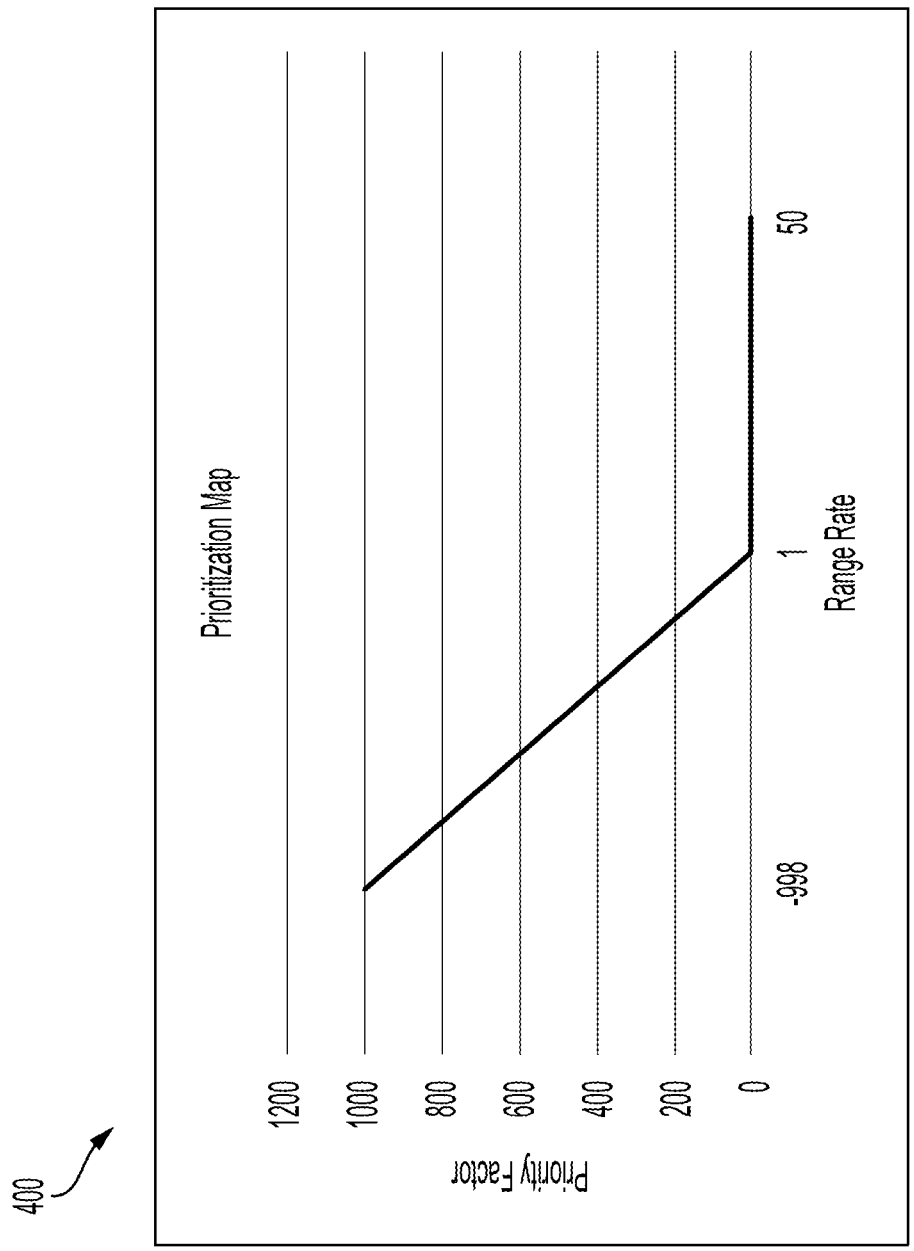
FIG. 4 illustrates an example graph of a prioritization map for use in prioritizing BSMs.

FIG. 4 illustrates an example graph of a prioritization map 402 for use in prioritizing BSMs. As shown, the Y-axis indicates a priority factor, while the X-axis indicates a range rate. A recommended default Prioritization Map is also shown below in Table 2.

TABLE 2

BSM Prioritization map

| Range Rate | Priority Factor |
| --- | --- |
| −998 | 1000 |
| 1 | 1 |
| 50 | 1 |

Referring back to FIG. 3, the BSM subservice 212 may implement a BSM interface 314 for use by the applications 120. The BSM interface 314 may provide the applications 120 with access to the buffer event list 302 and/or to the persistent event list 306. In some examples the BSM interface 314 may further allow access to additional information, such as host vehicle data (e.g., GNSS controller 104-F data, vehicle bus 108 data) and status message data.

Figure 5:
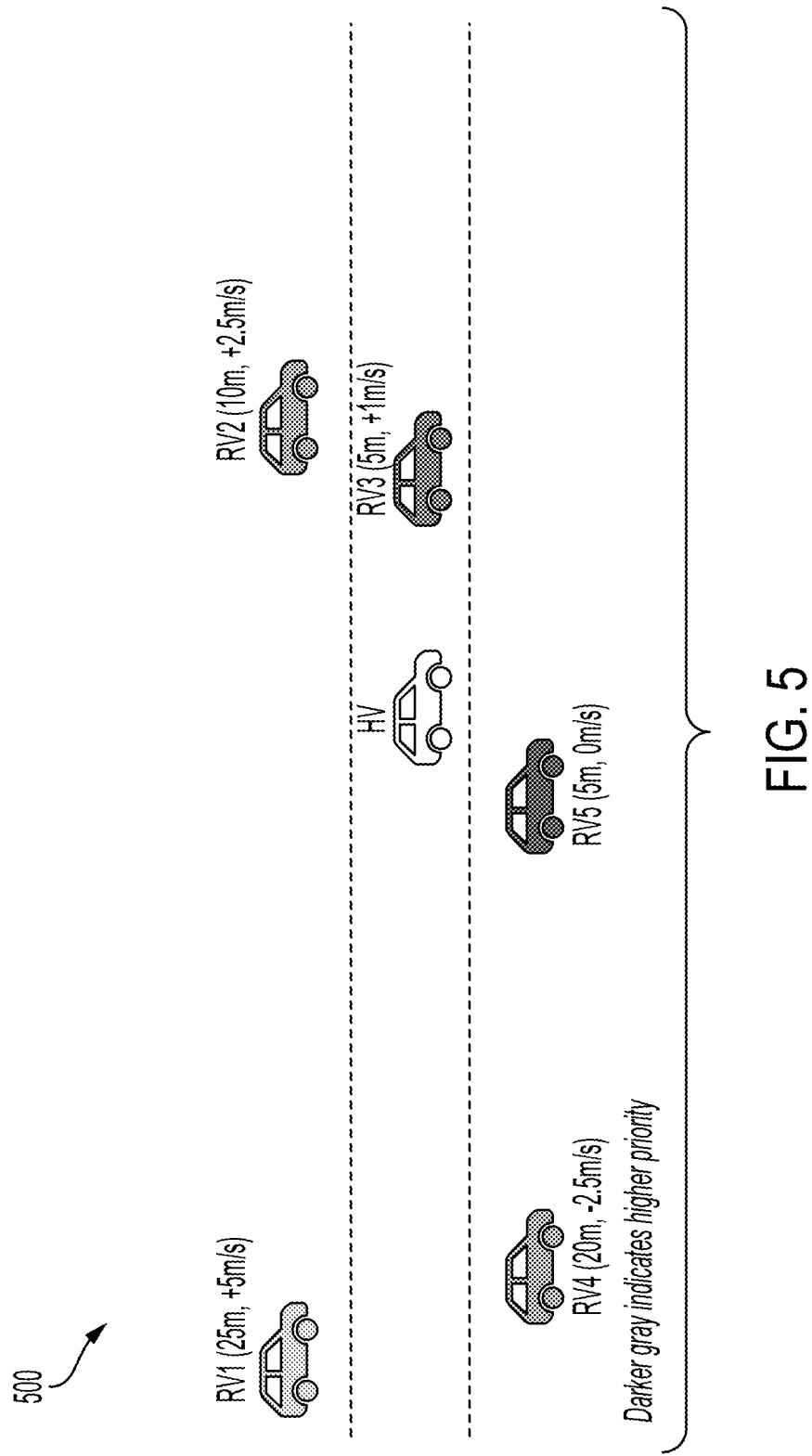
FIG. 5 illustrates an example scenario to illustrate how RVs are prioritized using the default prioritization map of FIG. 4.

FIG. 5 illustrates an example 500 scenario to illustrate how RVs are prioritized using the default prioritization map above. The range and range rate is shown for each RV. Range rate is relative speed of an RV with respect to the HV. A positive range rate means the RV is faster than the HV, a negative range rate means the RV is slower than the HV. This information may also be seen in Table 3.

TABLE 3

BSM Prioritization by Vehicle

| RV | Range | Range Rate | Priority Factor | Prioritized Range |
| --- | --- | --- | --- | --- |
| 1 | 25 | 5 | 1 | 25 |
| 2 | 10 | 2.5 | 1 | 10 |
| 3 | 5 | 1 | 1 | 5 |
| 4 | 20 | 0 | 2 | 10 |
| 5 | 5 | −2.5 | 4.50 | 1.1 |

While calculating priority based on range and range rate may be useful for oncoming and same direction vehicles 102, a different calculation based on time to intersect may be useful for intersecting vehicles 102. This may be because vehicles 102 with a shorter range and high range rate that are prioritized in other scenarios may pass the intersection before the host vehicle arrives and never pose an issue.

An example algorithm for intersecting vehicles may operate as follows to perform additional filtering based on predicted vehicle speed. The operations may include to predict vehicle speed using longitudinal acceleration: $v_{pred}=v+a*\Delta t_{pred}$, where $\Delta t_{pred}=2$ seconds in an example. The $v_{pred}$ may then be compared to thresholds to select only the relevant RVs.

A prioritization may be performed according to a Delta-Time-To-Intersection. This may include to calculate an intersecting point for each RV, and also to calculate Time-To-Intersection (TTI) for the RV and the HV, such that $\Delta TTI=TTI_{HV}-TTI_{RV}$, where lower $\Delta TTI$ represents a higher likelihood of an issue. Further aspects of prioritization and classifying of messages is discussed in detail in EP 21201562, filed Oct. 8, 2021, titled "Method for selecting data-packages," the contents of which are incorporated herein by reference in its entirety.

As noted above, the traffic light subservice 214 may be configured to receive SPaT/MAP messages, perform map matching and filtering out of information that does not apply to current vehicle 102 lanes, and send a custom data structure to the applications 120 descriptive of upcoming traffic lights. The traffic light sub service 214 may be configured to create a traffic light object and an intersection lane object to send to the applications 120.

SPaT and MAP messages are two independent messages broadcast by an RSU 128 at a traffic light. The MAP message may be broadcast every second and may contain an array of individual map elements for up to 32 intersections or road segments. Table 4 shows the structure of one MAP element as standardized in SAL J2735. The highlighted intersection identifiers (IDs) and Lane TDs may be used to correlate a MAP message with a SPaT Message. There are additional optional fields documented in the standard, a subset of the fields relevant for the traffic light subservice being shown herein.

TABLE 4

| MAP Message Content | | | |
|---|---|---|---|
| Intersection ID | Unique ID identifying an intersection or road segment | | |
| Reference point | Reference point (latitude, longitude, elevation) so other data points can use short offsets | | |
| Lane Set | Lane ID | Unique id for a lane within an intersection | |
| | Lane Attributes | Directional Use | Ingress or egress with respect to intersection |
| | | Shared With | Shared with other nonmotorized traffic, bus, taxi, pedestrian, cyclist, tracked vehicle - train, trolley |
| | | Lane Type | Vehicle, bike, crosswalk, sidewalk, parking, etc. |
| | Maneuvers | Allowed maneuvers for this lane (right, straight, left, u-turn) | |
| | Node list | Geometry of lane (varying format options allowed) | |
| | ConnectsTo (optional) | Connecting Lane | Connections to another lane through the intersection (lane id, maneuver) |
| | | Signal Group ID (optional) | Signal group ID to which the current lane belongs (correlates to a SPaT) |

Figure 6:
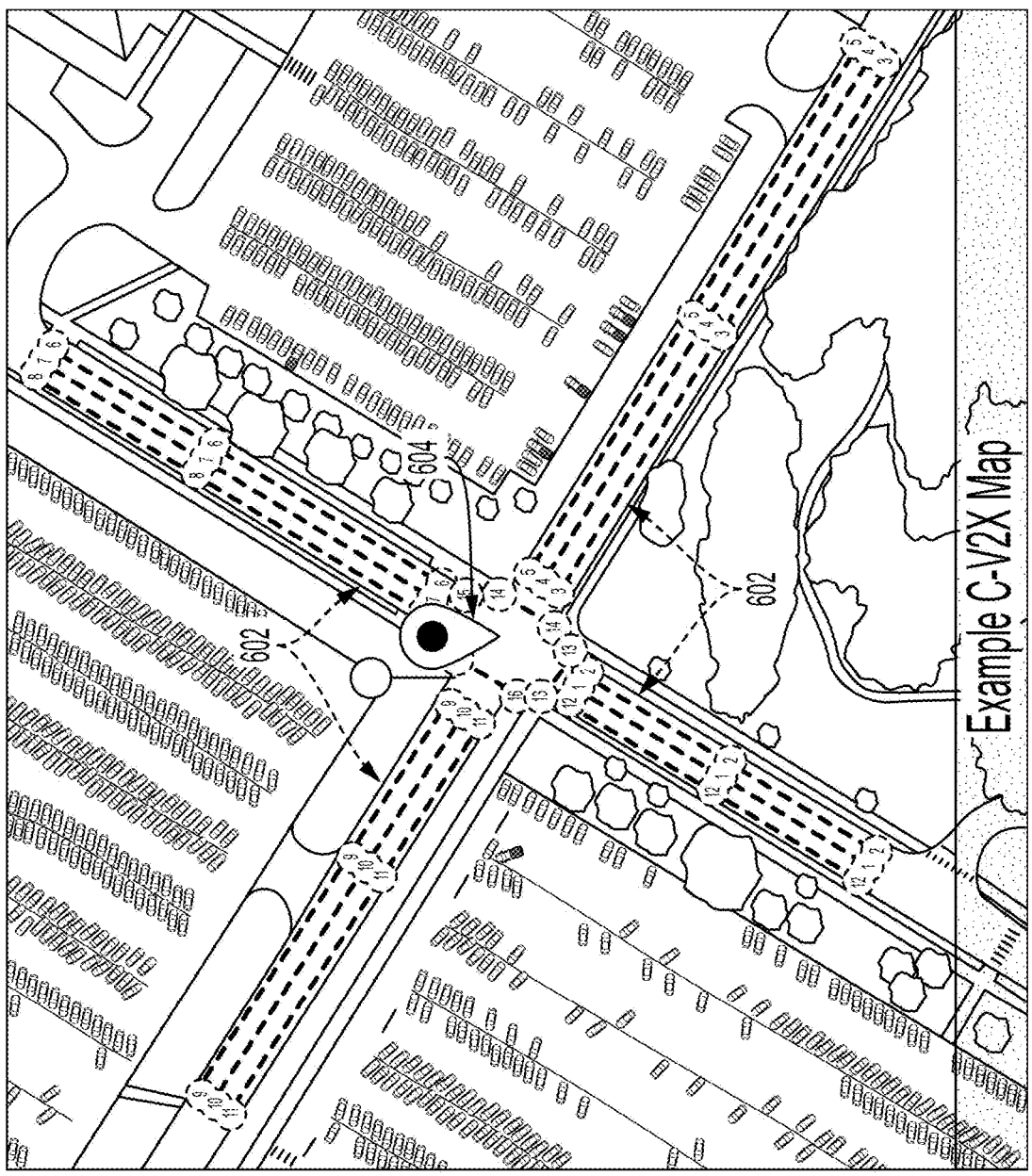
FIG. 6 illustrates an example intersection and visualization of an MAP message.

FIG. 6 illustrates an example intersection 600 showing a visualization of a MAP message. Lane lines 602 descriptive of the locations of the lanes of the roadway 118 and a central marker 604 of the intersection 600 are a visualization of aspects of the data in a MAP message. Each lane circle 606 is a node in the geometry layer of the MAP message, the numbering shows the lane IDs, and the central marker 604 represents the location reference point for the intersection 600. C-V2X MAPs cover a small area of interest around the intersection 600 or, in other examples, along a short section of roadway 118.

The SPaT message may be broadcast every 100 milliseconds and may contain information from the traffic light controller about the current state and timing of the traffic light. Like the MAP message, the SPaT message is an array with up to 32 individual SPaT structure elements shown in the table below. Table 5 illustrates example details of a subset of a SPAT message:

TABLE 5

| SPaT Message Content | | | |
|---|---|---|---|
| Intersection ID | Unique ID identifying an intersection | | |
| Revision | Count that gets updated when message is updated | | |
| status | Current operational state (non-working, preempted, fixed time, traffic dependent, etc.) | | |
| moy (optional) | UTC minute of the year timestamp for when message was created | | |
| timestamp (optional) | UTC milliseconds of the minute timestamp for when the message was created | | |
| states | Signal Group ID | Unique Id for a set of lights that follow the same state pattern. Can be correlated with lanes in the MAP. | |
| | state-time-speed | Event state | Stop-and-remain (red), Protected-movement-allowed (green), permissive-clearance (yellow), etc. |
| | | Timing (optional) | includes start and min/max end times of phase in UTC time |
| | | Speeds (optional) | speed advisories supporting green-wave and other needs |

Figure 7A:
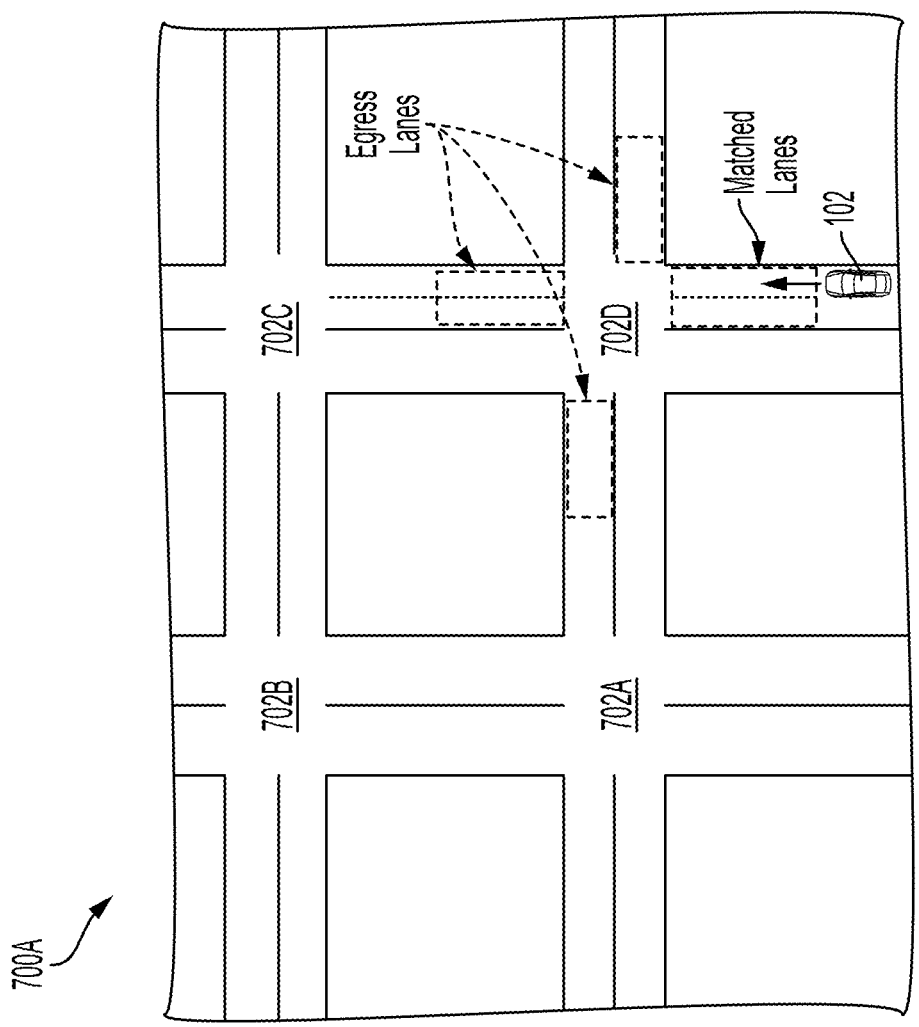
FIG. 7A illustrates an example diagram of MAP messages for a current intersection being approached by the vehicle.
Figure 7B:
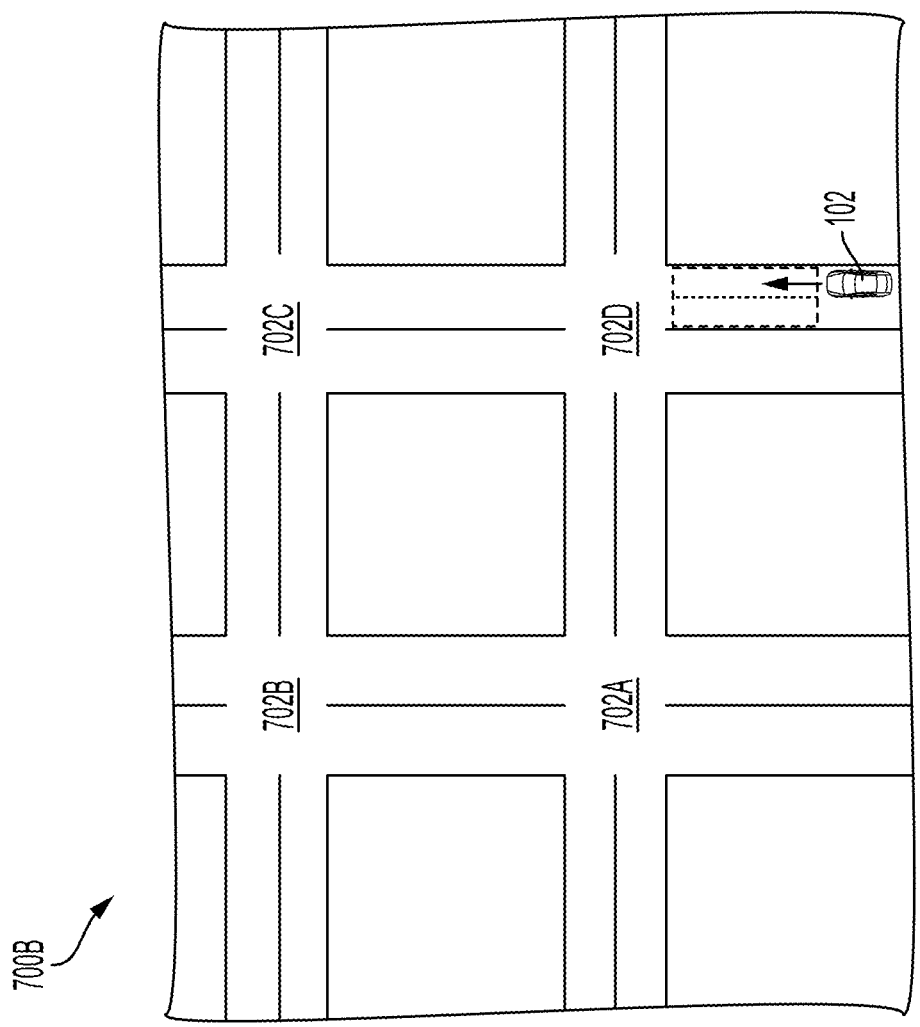
FIG. 7B illustrates an example diagram of MAP messages for a current intersection being approached by the vehicle.

FIG. 7A illustrates an example diagram 700A of MAP messages for a current intersection being approached by the vehicle 102. FIG. 7B illustrates an example diagram 700B of SPaT messages for a current intersection being approached by the vehicle 102. Specifically, the diagrams 700A and 700B each show the same four intersections 702A, 702B, 702C, and 702D. The vehicle 102 is approaching the intersection 702D. The MAP information for the intersection includes information about the current lane of travel of the vehicle 102, the matched lane or lanes. As shown in the diagram 700A, the MAP also includes information about the egress lanes of the intersection 702D, one of which the vehicle 102 will use to exit the intersection 702D. As shown in the diagram 700B, the current SPaT information includes traffic signal data with respect to the current ingress lane segment being traversed by the vehicle 102.

The traffic light subservice 214 may be configured to process these SPaT and MAP messages, which may be received from any RSUs 128 in range of that intersection 702D. Using this information, the traffic light subservice 214 may create a traffic light object responsive to the vehicle 102 being identified as being within the ingress lane of a C-V2X equipped traffic light. The traffic light object may provide a view of the combined data from the SPaT and MAP messages for use by the applications 120.

Figure 8A:
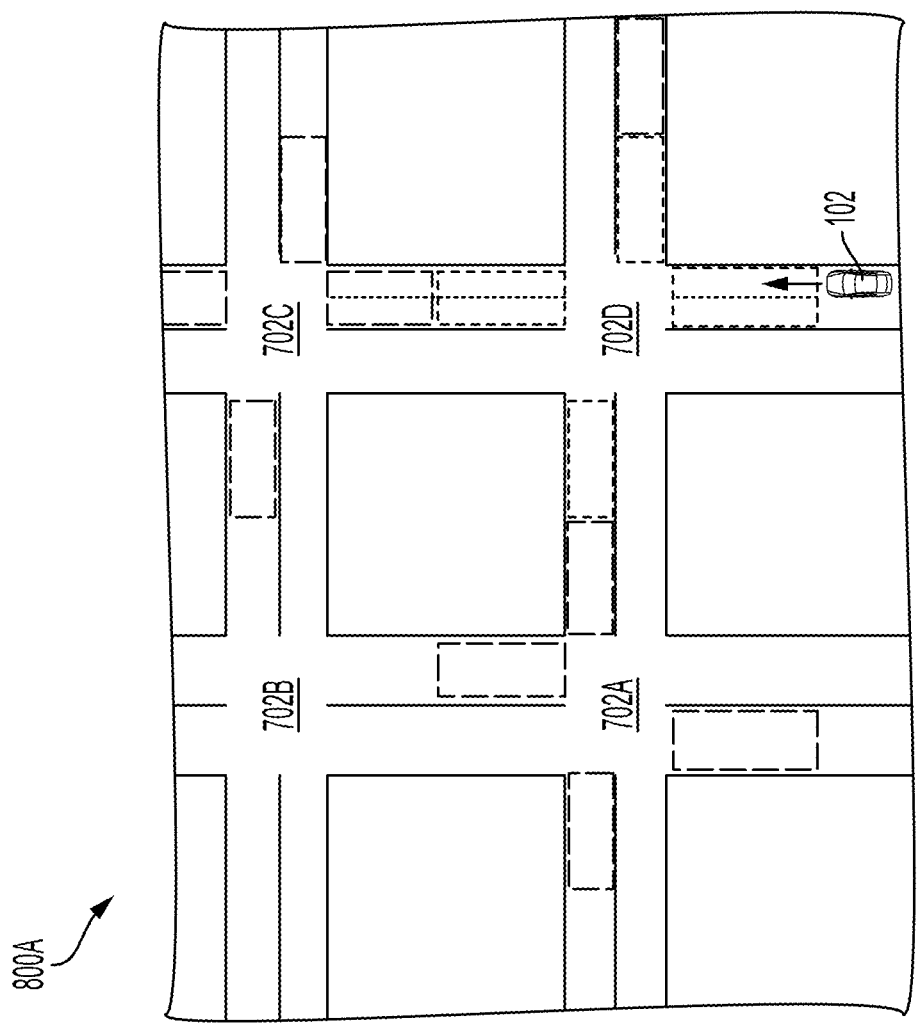
FIG. 8A illustrates an example diagram of MAP messages for a current and next intersection being approached by the vehicle.
Figure 8B:
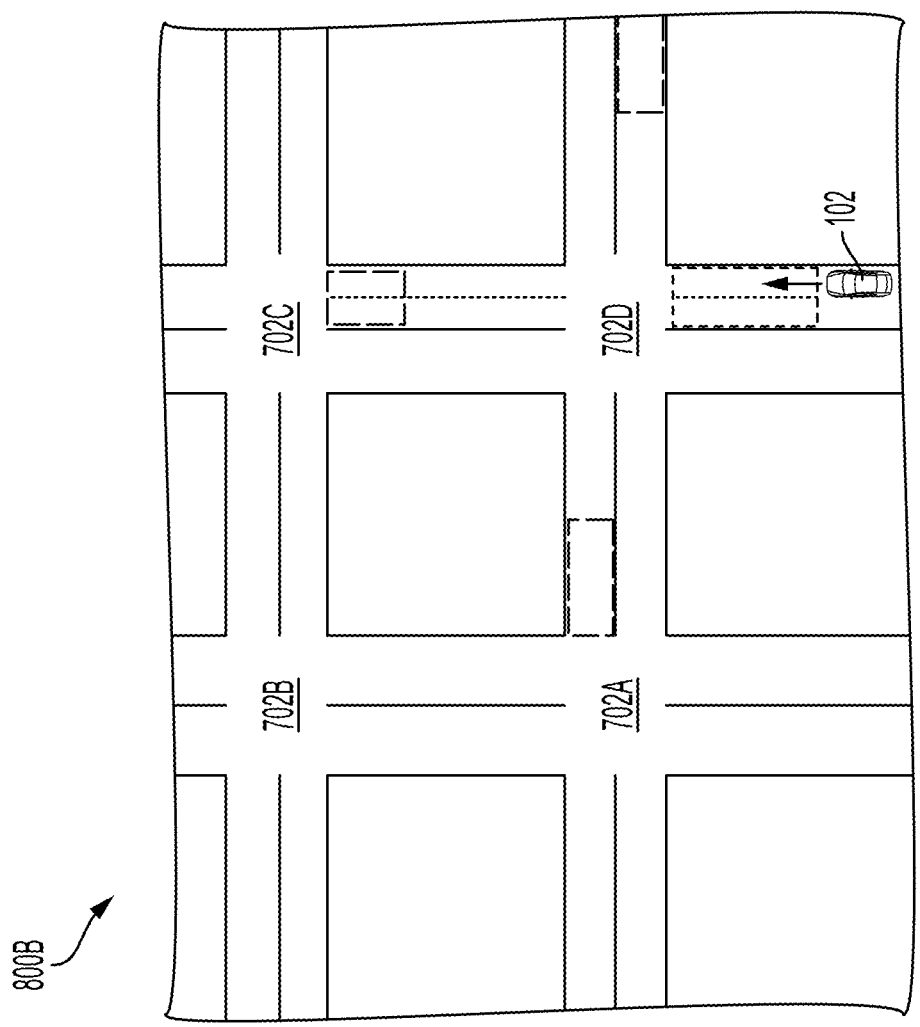
FIG. 8B illustrates an example diagram of SPaT messages for a current and next intersection being approached by the vehicle.

FIG. 8A illustrates an example diagram 800A of MAP messages for a current and next intersection being approached by the vehicle 102. FIG. 8B illustrates an example diagram 800B of SPaT messages for a current and next intersection being approached by the vehicle 102. Similar to as shown in the diagrams 700A and 700B, the diagrams 800A and 800B each show the same four intersections 702A, 702B, 702C, and 702D. The vehicle 102 is again approaching the intersection 702D. However, as shown in FIG. 8A, MAP information is shown for the current lane of travel of the vehicle 102, the egress lanes of the intersection 702D that the vehicle 102 is entering as well as MAP information for the next possible intersections that the vehicle 102 may enter after proceeding through one the egress lanes of the intersection 702D. As shown in the diagram 700B, the current SPaT information includes traffic signal data with respect to the current ingress lane segment being traversed by the vehicle 102 for the intersection 702D, as well as for the next intersections that the vehicle 102 may enter after proceeding through the intersection 702D. It should be noted that while MAP messages are discussed in many examples herein, in other instances other types of messages that include similar information may additionally or alternately be used, e.g., as connected message technology adapts over time.

This next intersection information may be useful in various situations. For example, a priority vehicle (such as an ambulance or rescue truck) may desire information from the current approached intersection and also information for the next intersection to be traversed by the priority vehicle 102. It should be noted that the current intersection information is shown as dotted lines, while the next intersection information is shown as dot-dashed lines.

Figure 9:
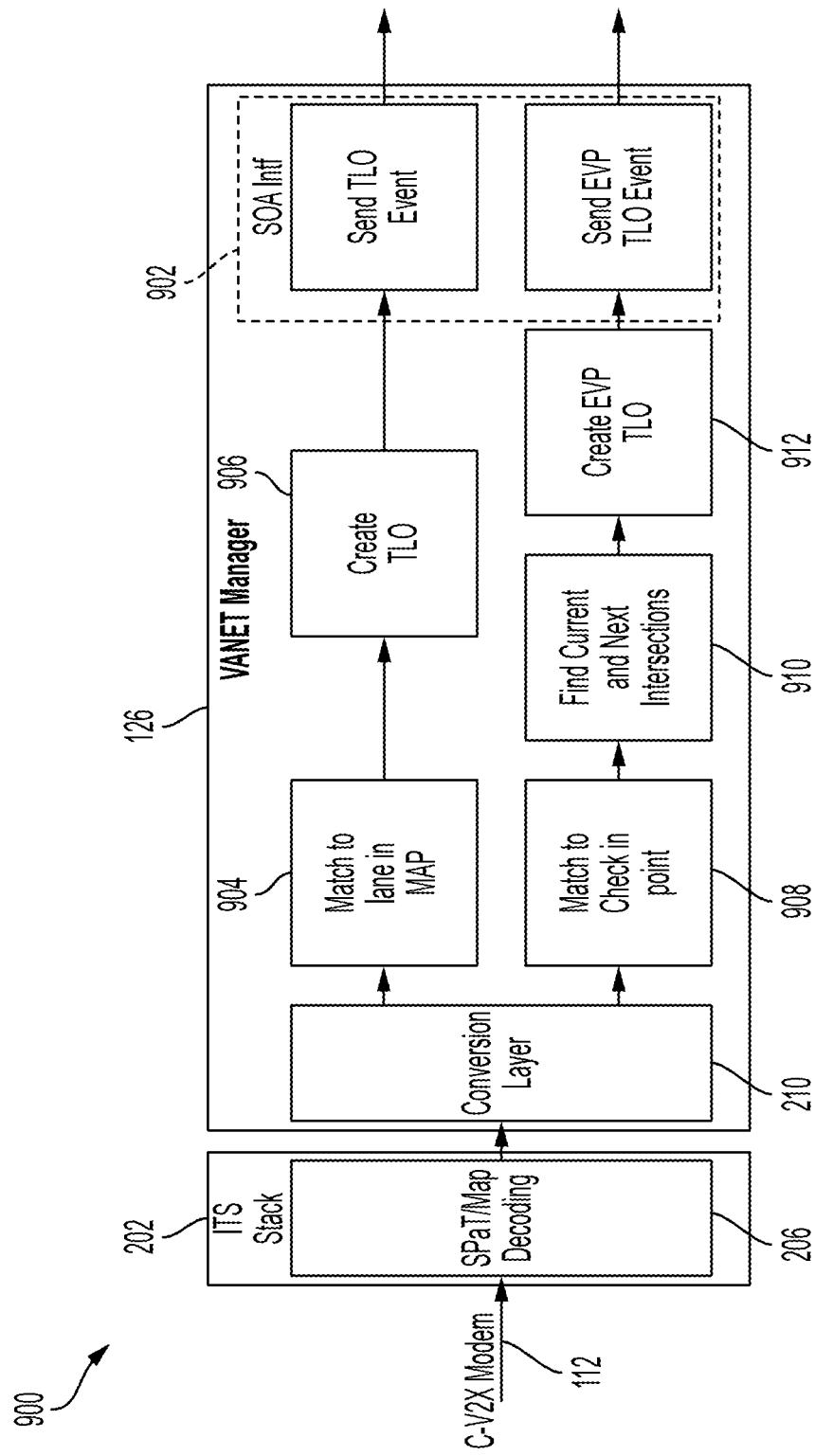
FIG. 9 illustrates further details of the traffic light subservice of the VANET manager.

FIG. 9 illustrates further details of the traffic light subservice 214 of the VANET manager 126. As shown, two events in a traffic light interface 902 may be provided to the applications 120. First, the information for the current intersection may be provided in a traffic light object (TLO). Second, there may also be an EVP traffic light object which may contain the standard traffic light object plus additional information for the next intersections and an MAP preemption priority application content layer. As shown, the traffic light interface 902 of the traffic light subservice 214 provides the TLO event and EVP TLO event services to the applications 120.

The traffic light subservice 214 may receive MAP and SPaT messages via the ITS stack 202 from modem 112. These messages may be decoded by the connectivity service 206 and provided to the VANET manager 126. The conversion layer 210 may convert these MAP and SPaT messages for further use by the traffic light subservice 214.

Figure 10:
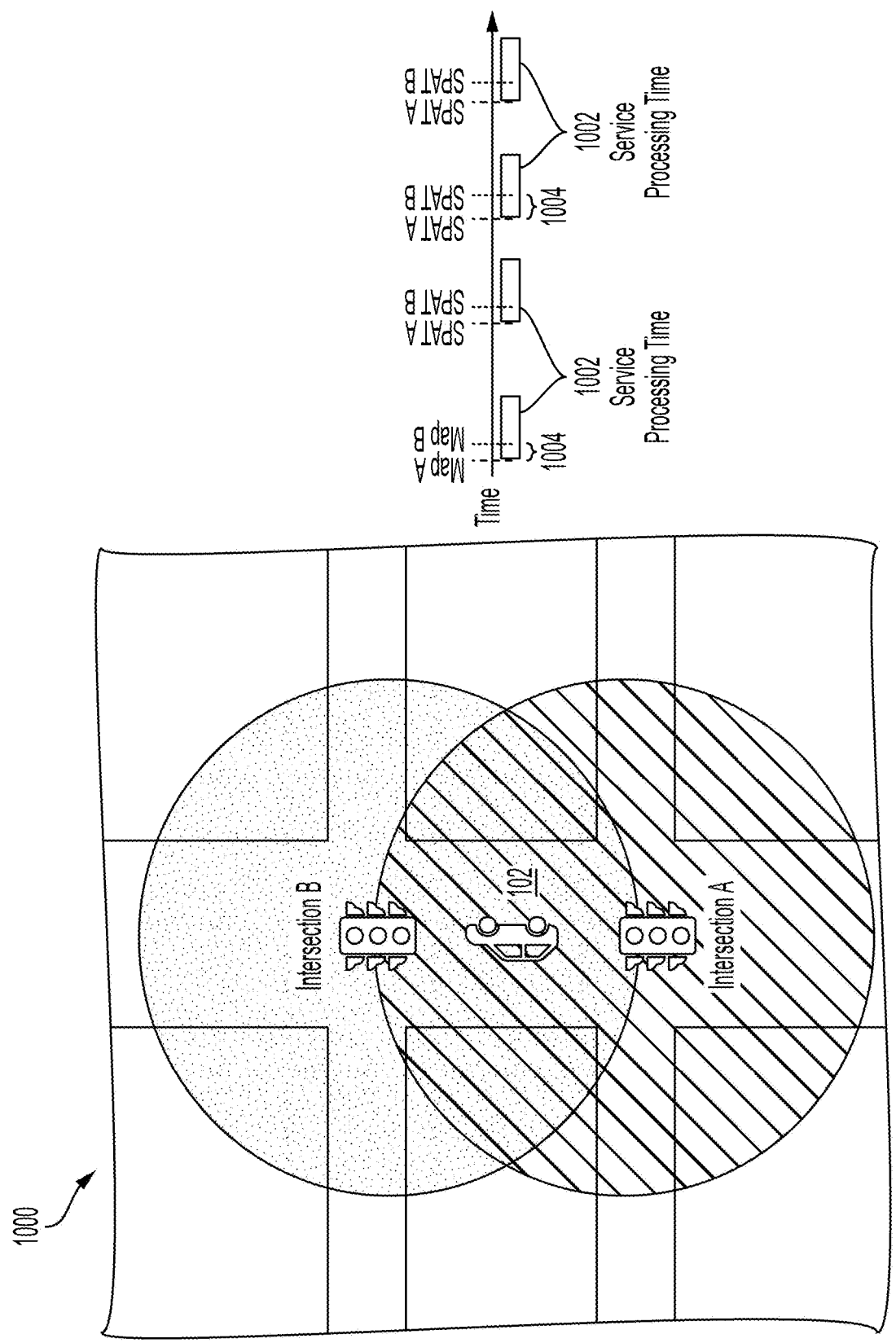
FIG. 10 illustrates an example diagram of a vehicle in communication range of multiple RSUs.
Figure 11:
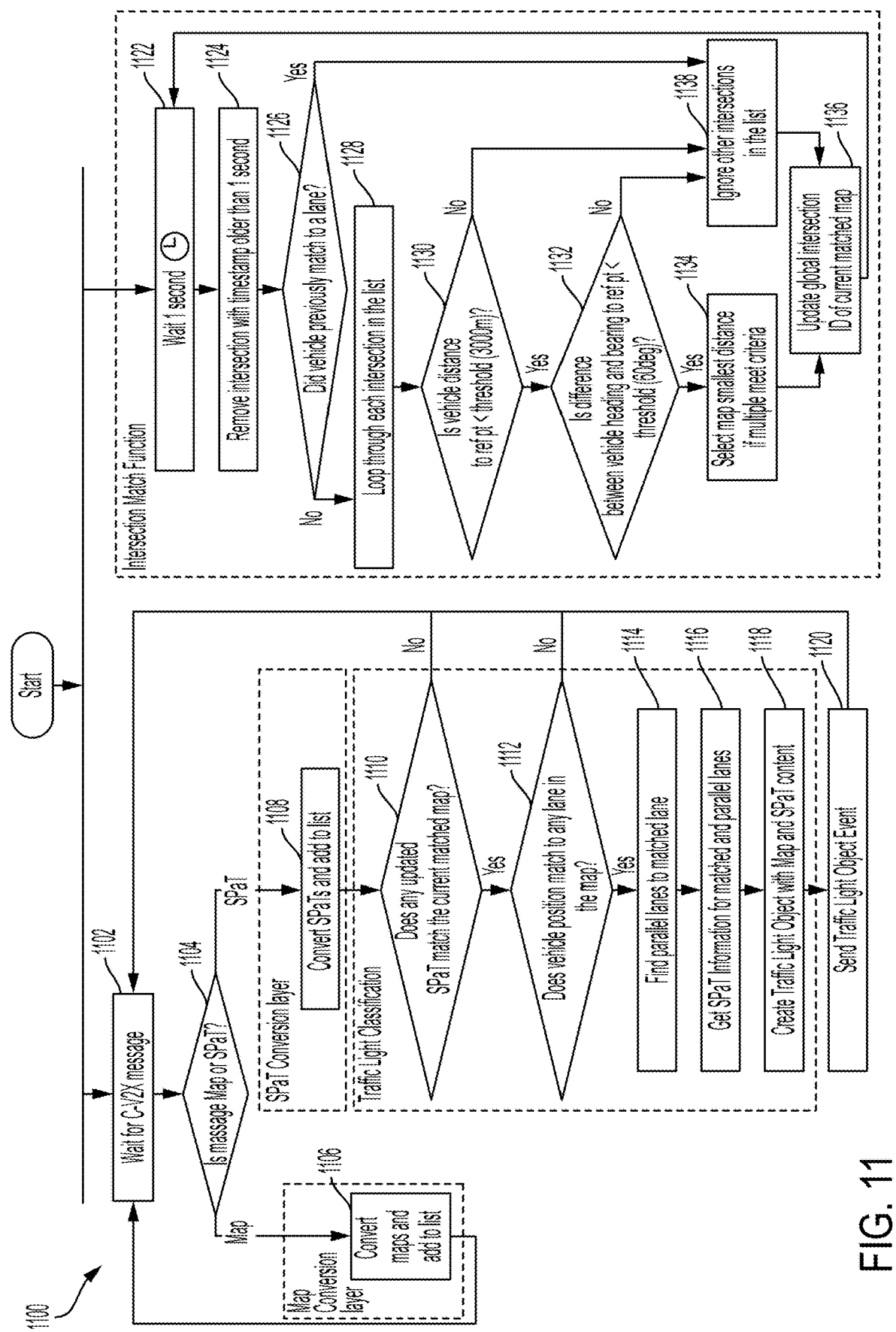
FIG. 11 illustrates an example process for the operation of the traffic light subservice for creating traffic light objects.
Figure 12:
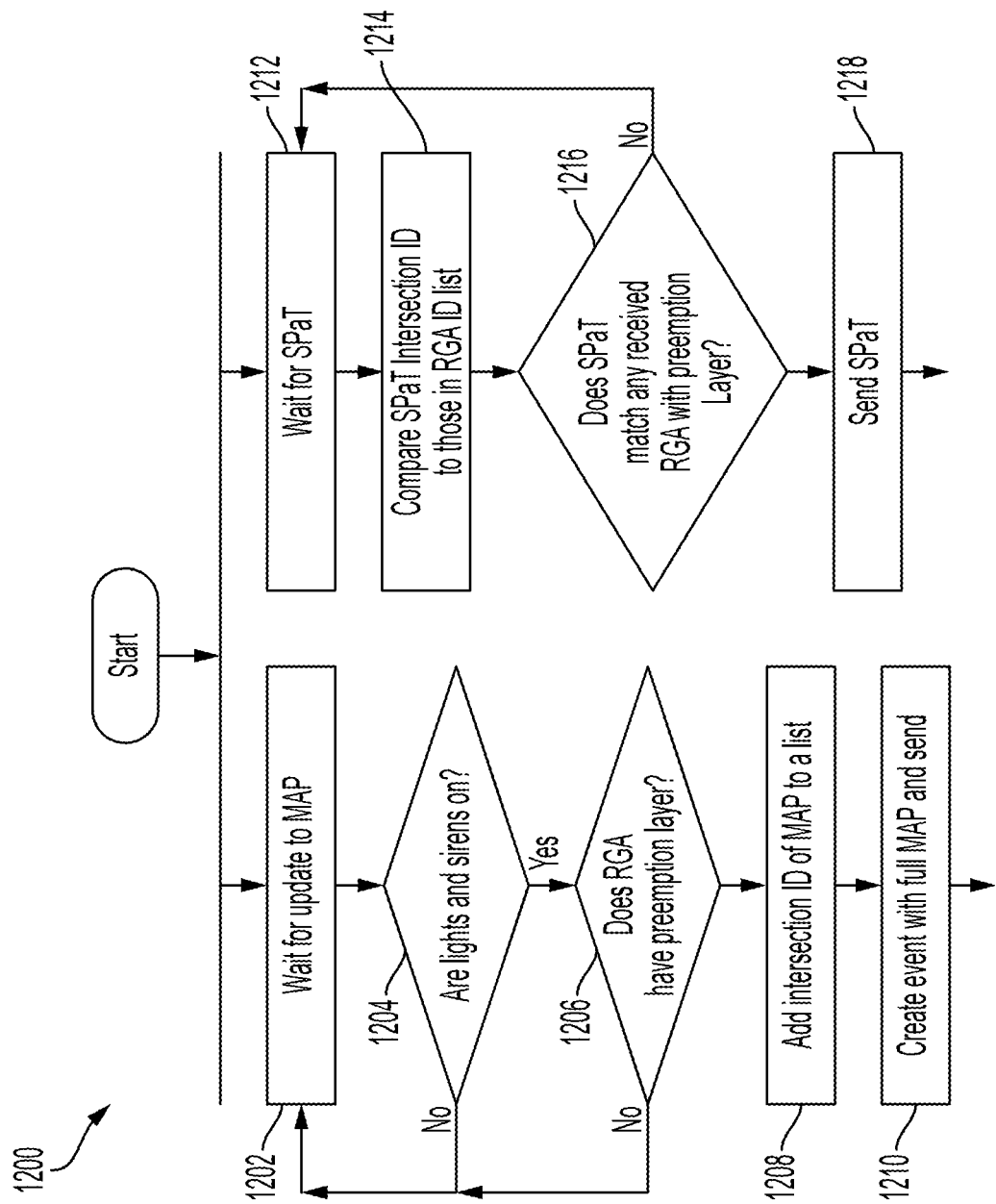
FIG. 12 illustrates an example process for the operation of the traffic light subservice for creating EVP traffic light objects.

As explain in further detail with respect to FIGS. 10-12, the traffic light subservice 214 may match the vehicle 102 lane in the MAP as shown at operation 904, and may create a TLO object for access to the applications 120 via the traffic light interface 902 at operation 906. Also, in parallel with the operations 904 and 906, the traffic light subservice 214 may match the vehicle 102 location to an intersection at operation 908, find current and next intersections at operation 910, and create an EVP TLO object for access to the applications 120 via the traffic light interface 902 at operation 912.

Table 6 illustrates example details of the TLO and EVP TLO data structures.

TABLE 6

Example TLO data structure.

| | | | |
|---|---|---|---|
| ID | Unique ID identifying an intersection (common between SPaT and MAP) | | |
| LightTiming | Timestamp | Timestamp from traffic light of when message was sent | |
| | Controller Status | enumeration for light controller operation state | |
| | LightState | ID | Unique Id for a set of lights that follow the same state pattern. Can be correlated with lanes in the MAP. |
| | | Array of stateTime | light enumeration for signal state (red, green, yellow) |
| | | | timing includes start and min/max end times of phase in UTC time |
| IntersectionMap | MapPoint | ID and center point in map | |
| | Matched Lanes Array | Lane ID | Unique identifier for 1 lane within the map. The rest of the information in this structure applies to this lane. |
| | | Matched | Enum (2 matched with DAT input, 1 matched with GNSS, 0 if it is an adjacent lane to the matched lane) |

TABLE 6-continued

Example TLO data structure.

|  |  |  |
|---|---|---|
|  | Confidence | INTEGER 0-100 Matched Confidence Percentage |
|  | LanePoints (ARRAY OF 0 . . . ?) | Points describing lane geometry (various formats allowed which can be converted to latitude, longitude) |
|  | (Various Lane Attributes . . .) | speed limits, maneuvers, connections, etc. |
| Egress Lanes Array | Same data structure as Matched Lane Set. |  |
| Preemption Layer |  | Included for EVP TLO events |
|  | Capabilities | List of capabilities (like preemption) supported by RSU |
|  | Frequency | Frequency to transmit preemption request after it has been confirmed by RSU |
|  | Request Point | Point(s) before map where emergency vehicle should start sending preemption request |
|  | Cancel Point | Egress point(s) where emergency vehicle should send preemption cancellation request |
|  | Next Intersections | |
|  | ID | Unique ID identifying an intersection (common between SPaT and MAP) |
|  | LightTiming | Same definition as LightTiming in standard TLO |
|  | IntersectionMap | Same definition as MAP in standard TLO |

FIG. 10 illustrates an example diagram 1000 of a vehicle 102 in communication range of multiple RSUs 128. As shown, it is possible that the vehicle 102 may be in range of more than one RSU 128 at once. Since a service processing time 1002 to map match to a lane and create a traffic TLO (e.g., as shown in FIGS. 9 and 11) may be longer than a time interval 1004 between each incoming message from the first and second RSUs 128, the traffic light subservice 214 may treat receiving the messages as a parallel process for map matching and creating a TLO.

FIG. 11 illustrates an example process 1100 for the operation of the traffic light subservice 214 for creating TLOs. As shown, the process 1100 may include two subprocesses—a subprocess for receiving the messages 122 and creating a TLO (shown on the left), and a subprocess for intersection matching (shown on the right). Aspects of the first subprocess may relate to operations 904 and 906 of the VANET manager 126 mentioned above.

Beginning with the subprocess for receiving messages, this process includes a portion for MAP message conversion, a portion for SPaT message conversion, and a portion for traffic light classification. At operation 1102 the traffic light subservice 214 waits for C-V2X messages 122. If, at decision 1104, the traffic light subservice 214 determines a message 122 is received, the traffic light subservice 214 further determines whether the message 122 is an MAP message 122 or a SPaT message 122.

If a MAP message 122 is received, control passes to operation 1106. At operation 1106, the traffic light subservice 214 converts the MAP message 122 into a VANET manager 126 representation and adds the MAP message 122 to a list of received MAP messages 122. In an example, the traffic light subservice 214 may utilize the MAP conversion layer 210 to perform the conversion. After operation 1106, control returns to operation 1102.

If a SPaT message 122 is received, control passes to operation 1108. At operation 1108, the traffic light subservice 214 converts the SPaT message 122 into a VANET manager 126 representation and adds the SPaT message 122 to a list of received SPaT messages 122. In an example, the traffic light subservice 214 may utilize the SPaT conversion layer 210 to perform the conversion.

The traffic light subservice 214 may also be configured to map the MAP and SPaT messages 122 together. In an example, after operation 1108 control may process to operation 1110. At operation 1110, the traffic light subservice 214 determines whether the received SPaT message matches to any of the MAP messages 122 in the MAP message list. If not, then control returns to operation 1102. If so, control proceeds to operation 1112.

At operation 1112, the traffic light subservice 214 further determines whether the position of the vehicle 102 matches to any lane of the matching MAP message 122. If not, then control returns to operation 1102. If so, control proceeds to operation 1114.

At operation 1114, the traffic light subservice 214 finds parallel lanes to the matched lane from the MAP message 122. At operation 1116, the traffic light subservice 214 retrieves SPaT information for the matches and parallel lanes. At operation 1118, the traffic light subservice 214 utilizes this information to create a TLO with the MAP and SPaT message 122 content.

At operation 1120, the traffic light subservice 214 sends the TLO object event. For instance, the TLO object event may be sent to any applications 120 subscribed to the TLO object service of the traffic light interface 902. After operation 1120, control returns to operation 1102.

Turning to the subprocess for intersection matching, at operation 1122, independent of the operations 1102-1120, the traffic light subservice 214 may wait a configurable period of time to periodically perform the intersection matching. This period may be one second, as one non-limiting example as shown, but may be different time periods in different examples. Responsive to expiration of the time period, the traffic light subservices 214 may check if the position of the vehicle 102 is within any MAP boundary.

More specifically, at operation 1124 the traffic light subservice 214 may remove intersections with a timestamp older than the period of time to perform the matching. At operation 1126, the traffic light subservice 214 determines whether the vehicle 102 previously matched to a lane of the roadway 118. If so, control passes to operation 1128. If not control passes to operation 1138.

At operation 1128, the traffic light subservice 214 loops through each intersection in the intersection list. The intersection list in this context refers to the list maintained by the matching of MAP and SPaT messages 122. For each of the intersections, the traffic light subservice 214 determines, at operation 1130, whether the location of the vehicle 102 (e.g., determined via the GNSS controller 104-F) is within a predefined distance (e.g., 3000 meters) of the central marker 604 reference point of the respective intersection. If so, then the process 1100 continues to operation 1132 to further determine whether a difference between the heading of the vehicle 102 and the bearing to the reference point is less than a threshold angle (e.g., 60 degrees).

If multiple matched MAP messages 122 and corresponding intersections are found, control proceeds to operation 1134 to allow the traffic light subservice 214 to select the MAP message 122 and corresponding intersection ID with the smallest distance from the vehicle 102. After operation 1134 control passes to operation 1136 to update the global intersection ID of the currently matched MAP message 122 from the intersection list. If only single intersection is a match, then control may pass from operation 1132 to operation 1136. If no intersections match, then either a previous intersection ID may again be used (or no ID if the timestamp is older than the timeout as noted at operation 1124).

At operation 1138, from operation 1124, the traffic light subservice 214 ignores the intersections of the list. In such a case, then either a previous intersection ID may again be used (or no ID if the timestamp is older than the timeout as noted at operation 1124).

Thus, responsive to the SPaT message 122 being received, the process 1100 may already have matched the message 122 to an intersection, if applicable. This is shown, for example, in operations 1108-1120 discussed above. If the SPaT message 122 corresponds to the current matched intersection, the map matching and event creation aspects may run. If not, the process 1100 may continue waiting for a new incoming SPaT message 122. Accordingly, the traffic light subservice 214 may be able to handle information from multiple traffic lights at once, as it may ignore information except for the intersection the vehicle 102 is currently approaching.

The approach for creation of an EVP TLO may differ from the creation of a standard TLO, because the EVP TLO event may be sent (e.g., via the EVP TLO event of the traffic light interface 902) when a vehicle 102 is near a location of a current intersection, before the vehicle 102 has reached an ingress lane of the intersection. In many examples, next intersections may also be included in an EVP TLO. The maps between the two intersections may not connect, so the next intersection may be determined by determining a distance between the end of egress lanes of the current intersection and the beginning of ingress lane of the next intersections. In addition, an angle between the egress lane of the current intersection and the ingress lane of the next intersection may also be compared and matched to ensure the angle is within a predefined maximum angle.

FIG. 12 illustrates an example process 1200 for the operation of the traffic light subservice 214 for creating EVP TLOs. The process 1200 may be performed by the traffic light subservice 214 in parallel to the process 1100 in many examples, and may relate to operations 908, 910, and 912 of the VANET manager 126. The process 1200 may include two subprocesses—a first relating to MAP messages 122 described with respect to operations 1204-1214, and a second relating to SPaT messages 122 described with respect to operations 1212-1218.

Referring first to the MAP messages 122, at operation 1204 the traffic light subservice 214 awaits an updated MAP message 122. In an example, the MAP messages 122 may be received as discussed above with respect to operations 1102-1106 of the process 1100.

At operation 1208, the traffic light subservice 214 identifies whether lights and/or sirens are on. In an example, the traffic light subservice 214 may identify the light and/or siren state via data received from the vehicle bus 108. If so, the process 1200 continues to operation 1210. If not, the process 1200 returns to operation 1204 to again wait for an updated MAP message 122.

At operation 1210, the traffic light subservice 214 determines whether the MAP message 122 includes preemption layers. In an example, some MAP messages 122 may include information with respect to traffic light preemption, such as a distance or location at which the vehicle 102 may request traffic light preemption, a second distance or location at which the vehicle 102 may request termination of traffic light preemption, etc. If so, control proceeds to operation 1212. If not, the process 1200 returns to operation 1204 to again wait for an updated MAP message 122.

At operation 1212, the traffic light subservice 214 adds an intersection ID of the MAP message 122 to a list of intersections supporting preemption. At operation 1214, the traffic light subservice 214 creates and sends an event with the EVP TLO information. This event may be raised by the EVP TLO event of the traffic light interface 902 to inform the applications 120.

Referring next to the SPaT messages 122, at operation 1212 the traffic light subservice 214 awaits SPaT message 122. In an example, the MAP messages 122 may be received as discussed above with respect to operations 1102-1104 and 1108 of the process 1100.

At operation 1214, the traffic light subservice 214 compares an intersection ID included in the SPaT message 122 with the IDs of intersections in the MAP list, e.g., as updated in operation 1212. At operation 1216, the traffic light subservice 214 determines whether the ID of the SPaT matches any received MAP messages 122 that include preemption layer information. If so, control passes to operation 1218 to send the SPaT to the applications 120 to process.

Figure 13:
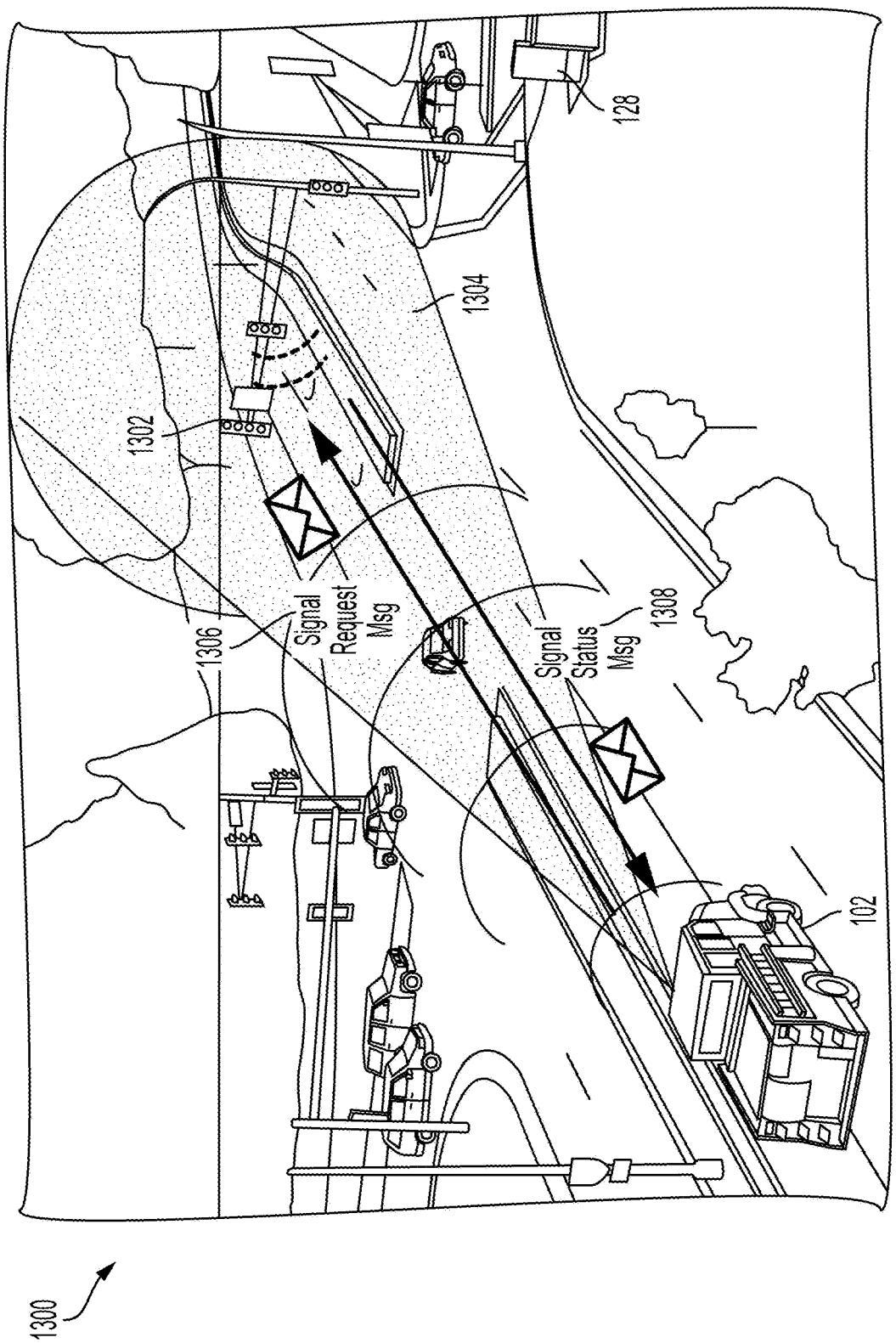
FIG. 13 illustrates an example diagram of operation of the vehicle preemption subservice.

FIG. 13 illustrates an example diagram 1300 of operation of the vehicle preemption subservice 216. An aspect of the vehicle preemption subservice 216 is to provide an approach for a vehicle preemption application 120 to request to change in the state of a traffic light 1302. Only authorized vehicles such as ambulances, ladder trucks, and police vehicles 102 may request to change the traffic light 1302 and reach their destination faster and reduce the possibility of getting into an accident with cross traffic at intersections 1304.

Responsive to the vehicle 102 approaching a traffic light 1302 in a red state, the vehicle 102 may send a SRM 1306 to a C-V2X RSU 128 installed at the traffic light 1302. The SRM 1306 may request to change the traffic light 1302 to a green state in the incoming direction of the vehicle 102. The RSU 128 may receive the SRM 1306 and send back a SSM 1308, indicating whether the preemption request may be executed or not.

Figure 14:
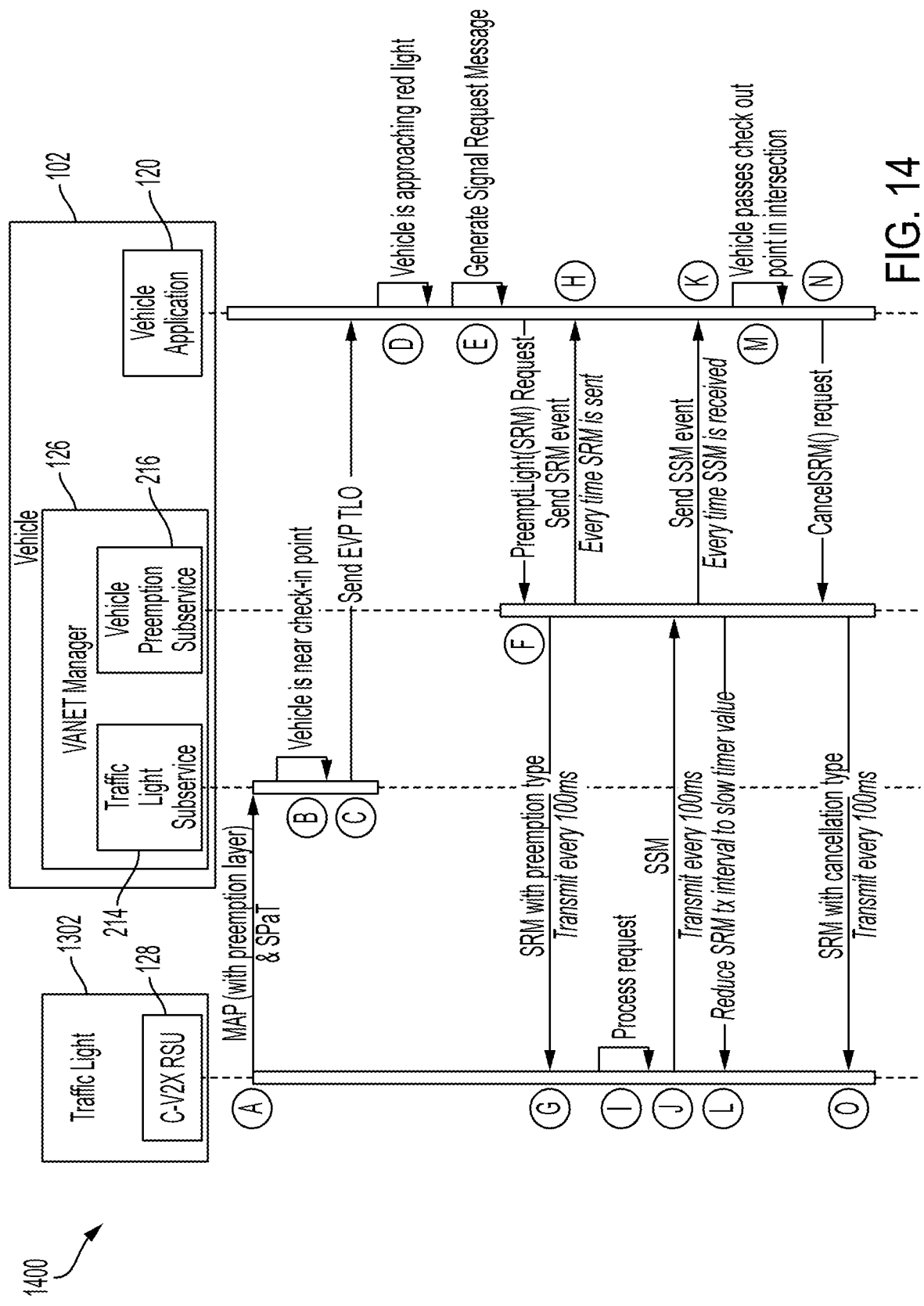
FIG. 14 illustrates an example data flow diagram for the operation of the vehicle preemption subservice.

FIG. 14 illustrates an example data flow diagram 1400 for the operation of the vehicle preemption subservice 216. As shown, the participants in the data flow diagram 1400 include the RSU 128 of the traffic light 1302, the traffic light subservice 214 and vehicle preemption subservice 216 of the VANET manager 126 of the vehicle 102, and an application 120 utilizing the services of the VANET manager 126. It should be noted that the operations related to receiving the MAP and SPaT messages 122 and to generating the EVP TLO events are consistent with the discussion of those operations of the traffic light subservice 214.

At index (A), the RSU 128 may send the MAP message 122 including the preemption layer and SPaT message 122. This messaging may be received by the modem 112 of the vehicle 102 and provided to the VANET manager 126, which in turn provided the messaging to the traffic light subservice 214 for processing as discussed above.

At index (B), the traffic light subservice 214 determines that the vehicle 102 is within range of coordinates of the intersection (e.g., the intersection center) as defined by the messaging. At index (C), responsive to the determination of the vehicle 102 as being within range of the intersection, the traffic light subservice 214 creates and raises an EVP TLO event in the traffic light interface 902. This event may be received by the application 120 as shown.

At index (D), the application 120 may determine, based on the EVP TLO, that the vehicle 102 is approaching a traffic light 1302 with a red signal. At index (E), the application 120 generates a SRM 1306 as shown in the diagram 1300.

At index (F), the application 120 sends a preempt light request to the vehicle preemption subservice 216. An example of the input parameters used to create a preempt light request is shown in Table 7.

TABLE 7

Preempt Light Request Input Parameters

| PreemptLight Input (array) | Light ID | Intersection ID | |
|---|---|---|---|
| | Request number | Counter for request | |
| | Requests (array) | Inbound Lanes | ID referring to a set of inbound lanes |
| | | Outbound lanes | ID referring to a set of outbound lanes |

At index (G), the vehicle preemption subservice 216 sends the SRM 1306 with a vehicle preemption type to the traffic light 1302. This may include the vehicle preemption subservice 216 providing the data of the SRM 1306 to the ITS stack interface 204 for encoding and then to the ITS stack 202 for transmission by the modem 112. While only shown once in the data flow diagram 1400, in many examples, the SRM 1306 may be send periodically (e.g., with a period of 100 milliseconds). In addition, as shown at index (H), the SRM 1306 may also be provided back to the application 120, e.g., each time the SRM 1306 is sent out. This may be done because the SRM 1306 may include information such as estimated time of arrival (ETA), which may be useful for the logic of the application 120.

Table 8 illustrates an example SRM 1306. In this example, data elements calculated by the VANET manager 126 are indicated by (i), data elements received from configuration data of the vehicle 102 are indicated by (ii), and the other data elements are included in the preempt light request input parameters.

TABLE 8

Example Service Request Message for Traffic Light Preemption

| Preemption Request (array) | Timestamp (i) | Current timestamp. | |
|---|---|---|---|
| | Light ID | Unique ID for this traffic light. | |
| | Vehicle ID (ii) | Unique ID for requesting vehicle | |
| | Request number | Counter for request | |
| | Request (i) | Enum of type of requestion from vehicle (i.e. preemption or cancellation) | |
| | requests[ ] | Inbound Lanes | ID referring to a set of inbound lanes |
| | | Outbound lanes | ID referring to a set of outbound lanes |

TABLE 8-continued

Example Service Request Message for Traffic Light Preemption

| | | |
|---|---|---|
| | Arrival Time Stamp (i) | Global clock time of estimated arrival |
| | Arrival offset (i) | Difference between current time and ETA |
| requestor | type (ii) | Type of vehicle performing request |
| | position (i) | Lat, lon, elevation of vehicle |
| | heading (i) | Heading of vehicle |
| | speed (i) | Speed of vehicle |
| | gear (i) | Current gear of vehicle (park, drive, etc.) |

At index (I), the RSU 128 processes the SRM 1306. In an example, the RSU 128 may validate that the vehicle 102 is authorized to make requests to adjust the state of the traffic light 1302. In another example, the RSU 128 may determine whether it is allowable to adjust the state of the traffic light 1302 based on other parameters, such as whether another preemption is already being performed, and/or if the state of the traffic light 1302 is one preemption is possible The RSU 128 may either accept the SRM 1306, and as shown at index (J), may send a SSM 1308 responsive to the determination. In an example, the SSM 1308 may be sent by the RSU 128 periodically, e.g., every 100 milliseconds corresponding to the repeat rate of sending of the SRM 1306.

The SSM 1308 may be received by the modem 112 of the vehicle 102, and provided to the VANET manager 126 and in turn to the vehicle preemption subservice 216 as shown at index (J). The SSM 1308 may be forwarded to the application 120 as shown at index (K). If multiple responses are received from the traffic light, only the response(s) corresponding with the preemption request sent by the application 120 may be forwarded back to the application 120. Table 9 illustrates an example SSM 1308.

vehicle preemption subservice 216. The vehicle preemption subservice 216 may, in turn, send a SRM 1306 with cancellation set to the RSU 128. Thus, responsive to the application 120 requesting to cancel a preemption request, the VANET manager 126 may transmit the same SRM 1306 noted above but with Part1.RequestType=PreemptionCancellation (6). Consistent with the other messaging in the data flow diagram 1400, this may also be sent periodically, e.g., every 100 milliseconds.

Figure 15:
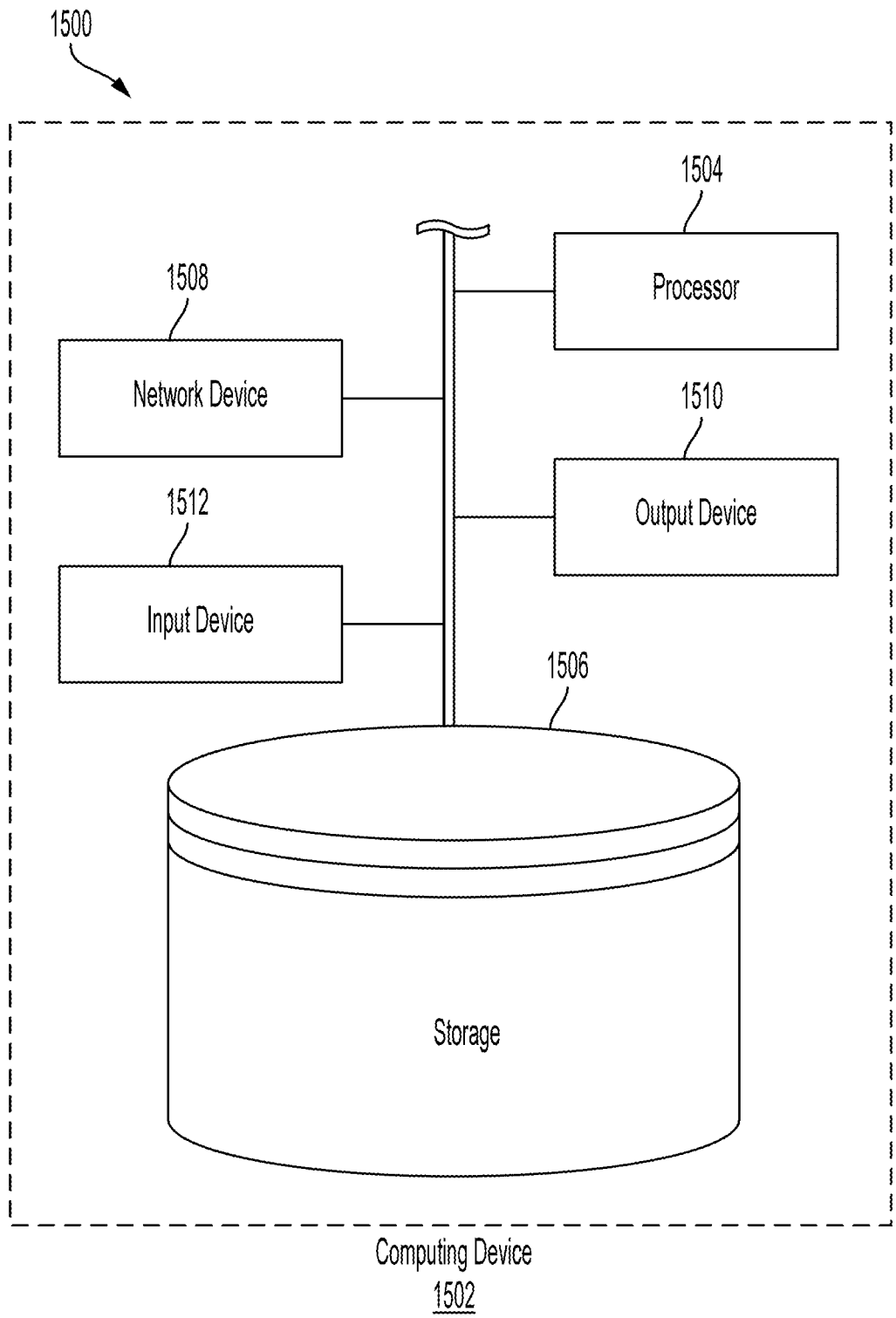
FIG. 15 illustrates an example of a computing device for the operation of the information-aware messaging protocol.

FIG. 15 illustrates an example 1500 of a computing device 1502 for the operation of the information-aware messaging protocol. Referring to FIG. 15, and with reference to FIGS. 1-14, the vehicles 102, controllers 104, TCUs 110, cloud servers 124, RSUs 128, and traffic lights 1302 may be examples of such computing devices 1502. As shown, the computing device 1502 includes a processor 1504 that is operatively connected to a storage 1506, a network device 1508, an output device 1510, and an input device 1512. It should be noted that this is merely an example, and computing devices 1502 with more, fewer, or different components may be used.

TABLE 9

Example Service Status Message for Traffic Light Preemption Response

| | | | | |
|---|---|---|---|---|
| Preemption Response (array) | timestamp | Current timestamp. | | |
| | Light ID | Unique ID for this traffic light. | | |
| | Vehicle ID | Unique ID for requesting vehicle | | |
| | Request number | Counter for request | | |
| | Request status | Enum of type of requestion from vehicle (i.e. preemption or cancellation) | | |
| | | Content number | INTEGER (0 . . . 255) | |
| | | sigStatus (array) | Requester Type | Type of vehicle performing request |
| | | | Inbound Lanes | ID referring to a set of inbound lanes |
| | | | Outbound lanes | ID referring to a set of outbound lanes |
| | | | Timestamp | Timestamp from request |
| | | | status | Response to request |

At index (L), the vehicle preemption subservice 216 may send a message to the RSU 128 to reduce the SRM 1306 transmit interval to slow the timer value. This may be done, as shown, responsive to receiving a SSM 1308 corresponding to the SRM 1306 from the RSU 128.

At index (M), the application 120 may determine that the vehicle 102 has passed the predefined exit point, such as having passed the center of the intersection, as indicated in the EVP TLO. If so, then the traffic light 1302 preemption may be discontinued. Thus, as shown at index (N), the application 120 may send a cancel SRM request to the The processor 1504 may include one or more integrated circuits that implement the functionality of a central processing unit (CPU) and/or graphics processing unit (GPU). In some examples, the processors 1504 are a system on a chip (SoC) that integrates the functionality of the CPU and GPU. The SoC may optionally include other components such as, for example, the storage 1506 and the network device 1508 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1504 executes stored program instructions that are retrieved from the storage 1506. The stored program instructions, accordingly, include software that controls the operation of the processors 1504 to perform the operations described herein. The storage 1506 may include both non-volatile memory and volatile memory devices. The non-volatile memory includes solid-state memories, such as negative-AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1510. The output device 1510 may include a graphical or visual display device, such as an electronic display screen, projector, printer, or any other suitable device that reproduces a graphical display. As another example, the output device 1510 may include an audio device, such as a loudspeaker or headphone. As yet a further example, the output device 1510 may include a tactile device, such as a mechanically raisable device that may, in an example, be configured to display braille or another physical output that may be touched to provide information to a user.

The input device 1512 may include any of various devices that enable the computing device 1502 to receive control input from users. Examples of suitable input devices that receive human interface inputs may include keyboards, mice, trackballs, touchscreens, voice input devices, graphics tablets, and the like.

The network devices 1508 may each include any of various devices that enable the vehicles 102 and cloud server 124 to send and/or receive data from external devices over networks. Examples of suitable network devices 1508 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A host vehicle implementing an ad-hoc network manager, comprising:
    a transceiver; and
    one or more controllers of the host vehicle, in communication with the transceiver, programmed to
        receive connected messages from remote vehicles via the transceiver, the connected messages indicating position, speed, time, and acceleration information of the remote vehicles, and
        execute a message subservice configured to provide, to vehicle applications executed by the one or more controllers:
            a first event periodically publishing a set of messages received from the remote vehicles within a predefined first time period, the first event indicating the connected messages received within the first time period, and
            a second event periodically publishing a second set of messages received from the remote vehicles within a predefined second time period, the second event indicating a complete listing of the remote vehicles, the second time period being longer than the first time period.

2. The host vehicle of claim 1, wherein the connected messages are sent from the remote vehicles periodically, and the predefined second time period is equal to an expected interval between receipt of consecutive connected messages from the remote vehicles.

3. The host vehicle of claim 1, wherein the one or more controllers are further programmed to classify the connected messages into a message classification the message classification being in terms of relative location with respect to the host vehicle and relative direction of travel with respect to the host vehicle.

4. The host vehicle of claim 3, wherein the message classification includes one or more of:
    (i) same direction and ahead of the host vehicle;
    (ii) same direction and behind the host vehicle;
    (iii) oncoming and ahead of the host vehicle;
    (iv) oncoming and behind the host vehicle;
    (v) intersecting and right of the host vehicle; or
    (vi) intersecting and left of the host vehicle.

5. The host vehicle of claim 3, wherein the one or more controllers are further programmed to, for the remote vehicles classified as being oncoming and same direction, prioritize the connected messages according to range of the remote vehicles from the host vehicle and relative speed of the remote vehicles with respect to the speed of the host vehicle.

6. The host vehicle of claim 3, wherein the one or more controllers are further programmed to, for the remote vehicles classified as being intersecting, prioritize the connected messages according to delta time of arrival of the remote vehicles to position of the host vehicle.

7. The host vehicle of claim 3, wherein the one or more controllers are further programmed to, for the remote vehicles classified as being intersecting:
    predict the speed of the remote vehicles using longitudinal acceleration of the remote vehicles with respect to the host vehicle; and
    filter out the remote vehicles exceeds thresholds such that the remote vehicles would not intersect a path of the host vehicle according to the predicted speed.

8. A method for implementing an ad-hoc network manager, comprising:
    receiving connected messages from remote vehicles via a transceiver of a host vehicle, the connected messages indicating position, speed, time, and acceleration information of the remote vehicles, and
    executing a message subservice, using one or more controllers of the host vehicle, to provide, to vehicle applications executed by the one or more controllers:
        a first event periodically publishing a set of messages received from the remote vehicles within a predefined first time period, the first event indicating the connected messages received within the first time period, and
        a second event periodically publishing a second set of messages received from the remote vehicles within a predefined second time period, the second event indicating a complete listing of the remote vehicles, the second time period being longer than the first time period.

9. The method of claim 8, wherein the connected messages are sent from the remote vehicles periodically, and the predefined second time period is equal to an expected interval between receipt of consecutive connected messages from the remote vehicles.

10. The method of claim 8, further comprising classifying the connected messages into a message classification the message classification being in terms of relative location with respect to the host vehicle and relative direction of travel with respect to the host vehicle.

11. The method of claim 10, wherein the message classification includes one or more of:
    (i) same direction and ahead of the host vehicle;
    (ii) same direction and behind the host vehicle;
    (iii) oncoming and ahead of the host vehicle;
    (iv) oncoming and behind the host vehicle;
    (v) intersecting and right of the host vehicle; or
    (vi) intersecting and left of the host vehicle.

12. The method of claim 10, further comprising, for the remote vehicles classified as being oncoming and same direction, prioritizing the connected messages according to range of the remote vehicles from the host vehicle and relative speed of the remote vehicles with respect to the speed of the host vehicle.

13. The method of claim 10, further comprising, for the remote vehicles classified as being intersecting, prioritizing the connected messages according to delta time of arrival of the remote vehicles to position of the host vehicle.

14. The method of claim 10, further comprising, for the remote vehicles classified as being intersecting:

predicting the speed of the remote vehicles using longitudinal acceleration of the remote vehicles with respect to the host vehicle; and filtering out the remote vehicles exceeds thresholds such that the remote vehicles would not intersect a path of the host vehicle according to the predicted speed.

15. A non-transitory computer-readable medium comprising instructions for implementing an ad-hoc network manager that, when executed by one or more controllers of a host vehicle, cause the host vehicle to perform operations including to:

receive connected messages from remote vehicles via a transceiver of the host vehicle, the connected messages indicating position, speed, time, and acceleration information of the remote vehicles, and execute a message subservice to provide to vehicle applications executed by the one or more controllers:
  a first event periodically publishing a set of messages received from the remote vehicles within a predefined first time period, the first event indicating the connected messages received within the first time period, and
  a second event periodically publishing a second set of messages received from the remote vehicles within a predefined second time period, the second event indicating a complete listing of the remote vehicles, the second time period being longer than the first time period.

16. The medium of claim 15, wherein the connected messages are sent from the remote vehicles periodically, and the predefined second time period is equal to an expected interval between receipt of consecutive connected messages from the remote vehicles.

17. The medium of claim 15, further comprising instructions that, when executed by the one or more controllers of the host vehicle, cause the host vehicle to perform operations including to classify the connected messages into a message classification the message classification being in terms of relative location with respect to the host vehicle and relative direction of travel with respect to the host vehicle, wherein the message classification includes one or more of:
  (i) same direction and ahead of the host vehicle;
  (ii) same direction and behind the host vehicle;
  (iii) oncoming and ahead of the host vehicle;
  (iv) oncoming and behind the host vehicle;
  (v) intersecting and right of the host vehicle; or
  (vi) intersecting and left of the host vehicle.

18. The medium of claim 17, further comprising instructions that, when executed by the one or more controllers of the host vehicle, cause the host vehicle to perform operations including, for the remote vehicles classified as being oncoming and same direction, to prioritize the connected messages according to range of the remote vehicles from the host vehicle and relative speed of the remote vehicles with respect to the speed of the host vehicle.

19. The medium of claim 17, further comprising instructions that, when executed by the one or more controllers of the host vehicle, cause the host vehicle to perform operations including, for the remote vehicles classified as being intersecting, to prioritize the connected messages according to delta time of arrival of the remote vehicles to position of the host vehicle.

20. The medium of claim 17, further comprising instructions that, when executed by the one or more controllers of the host vehicle, cause the host vehicle to perform operations including, for the remote vehicles classified as being intersecting, to:
  predict the speed of the remote vehicles using longitudinal acceleration of the remote vehicles with respect to the host vehicle; and
  filter out the remote vehicles exceeds thresholds such that the remote vehicles would not intersect a path of the host vehicle according to the predicted speed.

* * * * *